US009389897B1

(12) United States Patent
Busaba et al.

(10) Patent No.: US 9,389,897 B1
(45) Date of Patent: Jul. 12, 2016

(54) EXITING MULTIPLE THREADS OF A SIMULATION ENVIRONMENT IN A COMPUTER

(71) Applicant: International Business Machines Corporation, Armonk, NY (US)

(72) Inventors: Fadi Y. Busaba, Poughkeepsie, NY (US); Mark S. Farrell, Pleasant Valley, NY (US); Lisa C. Heller, Rhinebeck, NY (US); Michael P. Mullen, Poughkeepie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/575,100

(22) Filed: Dec. 18, 2014

(51) Int. Cl.
*G06F 9/455* (2006.01)

(52) U.S. Cl.
CPC ........ *G06F 9/45545* (2013.01); *G06F 9/45558* (2013.01)

(58) Field of Classification Search
CPC .................................................. G06F 9/45545
USPC ....................................................... 718/1–108
See application file for complete search history.

(56) References Cited

U.S. PATENT DOCUMENTS

| | | | |
|---|---|---|---|
| 4,253,145 A | 2/1981 | Goldberg | |
| 4,564,903 A | 1/1986 | Guyette | |
| 4,816,991 A | 3/1989 | Watanabe et al. | |
| 5,437,033 A | 7/1995 | Inoue et al. | |
| 6,269,391 B1 | 7/2001 | Gillespie | |
| 6,854,114 B1 | 2/2005 | Sexton et al. | |
| 7,502,884 B1 * | 3/2009 | Shah | H04K 67/1097 370/395.21 |
| 7,526,421 B2 | 4/2009 | Deitch | |
| 8,091,086 B1 * | 1/2012 | Ershov | G06F 9/5077 718/1 |

(Continued)

FOREIGN PATENT DOCUMENTS

| | | |
|---|---|---|
| EP | 0067344 A2 | 12/1982 |
| EP | 0145960 A2 | 6/1985 |
| EP | 2704050 A1 | 5/2014 |

OTHER PUBLICATIONS

Ševčík, Jaroslav, et al. "Relaxed-memory concurrency and verified compilation." ACM SIGPLAN Notices. vol. 46. No. 1. ACM, 2011. pp. 43-54.*

(Continued)

*Primary Examiner* — Satish Rampuria
(74) *Attorney, Agent, or Firm* — Cantor Colburn LLP; Margaret McNamara

(57) ABSTRACT

Embodiments relate to exiting a multithreaded guest virtual machine (VM) that is running in a simulation environment. An aspect includes executing the simulation by a guest entity comprising a plurality of logical threads, wherein each of the plurality of logical threads comprises a respective instruction stream. Another aspect includes detecting an exit event corresponding to completion, by a first thread of the plurality of logical threads, of the instruction stream corresponding to the first thread. Another aspect includes, based on determining that the simulation is executing in a redrive mode: based on determining that the TVM of the guest entity indicates that multiple threads of the plurality of logical threads are valid, nullifying a start interpretive execution (SIE) instruction of a host; setting a bit corresponding to the first thread in the TVM to invalid; executing the nullified SIE instruction; and relaunching the guest entity in the redrive mode.

20 Claims, 17 Drawing Sheets

(56) References Cited

U.S. PATENT DOCUMENTS

| | | | |
|---|---|---|---|
| 8,621,459 | B2 | 12/2013 | Levit-Gurevich et al. |
| 8,725,485 | B2 | 5/2014 | Tatsuoka et al. |
| 2002/0124241 | A1 | 9/2002 | Grey et al. |
| 2004/0117539 | A1 | 6/2004 | Bennett |
| 2004/0215932 | A1 | 10/2004 | Burky et al. |
| 2004/0236562 | A1* | 11/2004 | Beckmann ............. G06F 9/546 703/22 |
| 2006/0005188 | A1 | 1/2006 | Vega et al. |
| 2006/0174053 | A1 | 8/2006 | Anderson |
| 2006/0242643 | A1 | 10/2006 | Beimar et al. |
| 2007/0028238 | A1 | 2/2007 | Bennett |
| 2008/0155536 | A1* | 6/2008 | Levit-Gurevich ..... G06F 9/4843 718/1 |
| 2008/0184240 | A1 | 7/2008 | Franaszek |
| 2008/0288941 | A1 | 11/2008 | Adams |
| 2009/0007112 | A1 | 1/2009 | Morik |
| 2009/0100424 | A1 | 4/2009 | Otte et al. |
| 2009/0217264 | A1 | 8/2009 | Heller |
| 2010/0235847 | A1 | 9/2010 | Brehmer et al. |
| 2013/0185738 | A1 | 7/2013 | Farrell et al. |
| 2013/0191832 | A1 | 7/2013 | Busaba et al. |
| 2014/0337848 | A1 | 11/2014 | Llamas et al. |
| 2015/0212845 | A1* | 7/2015 | Tsirkin ............... G06F 9/45558 711/114 |
| 2015/0212846 | A1* | 7/2015 | Tsirkin ............... G06F 9/45558 711/114 |

OTHER PUBLICATIONS

Collins, Jamison D., et al. "Speculative precomputation: Long-range prefetching of delinquent loads." ACM SIGARCH Computer Architecture News. vol. 29. No. 2. ACM, 2001, pp. 14-25.*

Mehner, Katharina. "JaVis: A UML-based visualization and debugging environment for concurrent Java programs." Software Visualization. Springer Berlin Heidelberg, 2002. pp. 163-175.*

F. Busaba, et al., "Exiting Multiple Threads in a Computer," U.S. Appl. No. 14/226,967, filed Mar. 27, 2014.

J. Bradbury, et al., "Start Virtual Execution Instruction for Dispatching Multiple Threads in a Computer," U.S. Appl. No. 14/227,003, filed Mar. 27, 2014.

List of IBM Patents or Patent Applications Treated as Related; Dec. 18, 2014; pp. 1-2.

"zArchitecture Principles of Operation," Tenth Edition, Sep. 2012, Publication No. SA22-7832-09, copyright IBM Corp., 886 pages.

Martin Baumi, "Hardware Virtualization Support for Afterburner/L4", Mar. 4, 2007, pp. 1-27.

P.H. Gum, "System/370 Extended Architecture: Facilities for Virtual Machines", IBM J. Res. Develop, vol. 27, No. 6, Nov. 1983; 15 pages.

U.S. Appl. No. 14/226,986; Non-Final Office Action; Date Filed: Mar. 27, 2014; Date Mailed: Dec. 7, 2015; 49 pages.

Uk International Search Report and Written Opinion for International Application No. PCT/EP2015/054731; International Filing Date: Mar. 6, 2015; Date of Mailing Jun. 29, 2015; 12 pages.

UK International Search Report and Written Opinion for International Application No. PCT/EP2015/054741; International Filing Date: Mar. 6, 2015; Date of Mailing: Jun. 9, 2015; 9 pages.

UK International Search Report and Written Opinion for International Application No. PCT/EP2015/055442; International Filing Date: Mar. 16, 2015; Date of Mailing: Jul. 7, 2015; 11 pages.

UK International Search Report and Written Opioinion for International Application No. PCT/EP2015/055942; International Filing Date: Mar. 20, 2015; Date of Mailing Jun. 30, 2015 13 pages.

* cited by examiner

EXITING MULTIPLE THREADS OF A SIMULATION ENVIRONMENT IN A COMPUTER

BACKGROUND

The present invention relates generally to multithreading (MT), and more specifically, to a machine implementation for exiting virtual-execution of multiple threads of a simulation environment in a computer.

Multithreading (MT) provides a means for increasing the number of processor threads that can operate in parallel within a single physical processor core without the need to add additional cores. Ideally, MT provides this increased capacity by having one or more threads use portions of the core hardware that are currently not being used by the other thread(s) running on the same core. For example, during the latency caused by a cache-miss or other delay in one thread, one or more other threads can utilize the core resources, thus increasing the utilization of the resources. Even though in practice, this sharing results in some interference between the threads and requires some additional hardware, MT still provides the ability to perform each thread's work using less hardware than would be required if each thread were to run on its own isolated core hardware. Often, additional benefit can be derived from MT when the sharing of hardware resources between threads also decreases the overall strain on the computer system to provide information, such as data from memory, to two unique cores.

Typically, although MT provides hardware savings, the addition of another work thread consumes the same coordination cost at the hypervisor level that would be required to provide increased capacity using an additional, separate core. In many instances, once a certain scaling ratio is achieved, the overhead to coordinate resources between work threads, whether run on a single or shared core, is substantial and can decrease or even outweigh the benefits seen by the ability to run an independent work thread. That is, in general there is more management overhead as the number of things to manage increases.

SUMMARY

Embodiments include a system, method, and computer program product for exiting a multithreaded guest virtual machine (VM) that is running in a simulation environment in a configuration comprising a machine enabled to operate in a single thread (ST) mode and a multithreading (MT) mode, the machine including physical threads. An aspect includes executing the simulation by a guest entity on the core in MT mode, the guest entity comprising all or a portion of a guest VM, and the guest entity comprising a plurality of logical threads executing on the physical threads, wherein each of the plurality of logical threads comprises a respective instruction stream. Another aspect includes detecting, at the machine, an exit event corresponding to completion, by a first thread of the plurality of logical threads, of the instruction stream corresponding to the first thread. Another aspect includes, based on the detecting, determining whether the simulation is executing in a redrive mode or a wait mode, and, based on determining that the simulation is executing in the redrive mode: determining whether a thread validity marker (TVM) of the guest entity indicates that multiple threads of the plurality of logical threads are valid; based on determining that the TVM of the guest entity indicates that multiple threads of the plurality of logical threads are valid, nullifying a start interpretive execution (SIE) instruction of a host; setting a bit corresponding to the first thread in the TVM to invalid; initiating execution of the host, wherein initiating execution of the host comprises executing the nullified SIE instruction; and, based on executing the nullified SIE instruction, relaunching the guest entity in the redrive mode.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 14, which includes FIG. 15, which includes

DETAILED DESCRIPTION

Figure 1:
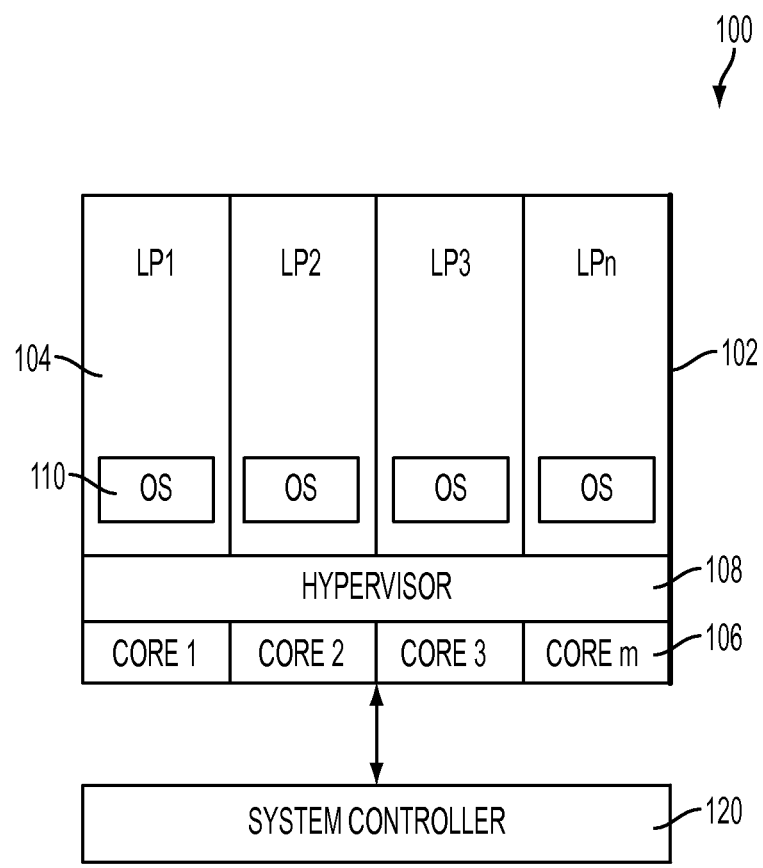
FIG. 1 depicts a computing environment that may be implemented in accordance with an embodiment.

Embodiments of exiting multiple threads of a simulation are provided, with exemplary embodiments being discussed below in detail. A multithreading (MT) environment such as is disclosed in U.S. patent application Ser. No. 14/226,967 (filed Mar. 27, 2014, Busaba et al.), which is herein incorporated by reference in its entirety, may be used to execute a simulation, or test case, as a guest in a host system. The simulation may include multiple threads, each thread having a respective stream of instructions. For a simulation that is run as a guest in such an MT environment, all of the instructions in all of the threads of the simulation need to be completed so as to obtain the full results of the simulation. Therefore, a wait mode and a redrive mode are provided that ensure that all of the instructions of all of the threads of the simulation are completed before exiting the simulation. A simulation may specify upon beginning of execution whether the simulation should be executed in the redrive mode or the wait mode.

In the wait mode, the guest remains active until each of the valid threads of the guest have completed all of their respective instructions. When a thread finishes its instruction stream, it waits until all the other threads have also finished their instruction streams, and then the guest exits to the host. In the redrive mode, when a first thread of a plurality of threads of a simulation reaches its exit condition (i.e., finishes its instruction stream), the first thread signals to the other threads to exit. Because the first thread has finished its instruction stream, a validity marker of the first thread is set to invalid, while any other threads that have not finished their instruction streams remain valid. Further, the core dispatch instruction of the host, which may comprise a start-VE (virtual execution) or a SIE (start interpretive execution) instruction, is nullified so as to point back to the instruction address (IA) of the host SIE instruction. Therefore, when the guest exits and control is returned to the host, the start-VE or SIE command is immediately executed by the host, and control returns to the guest. The guest then resumes execution of only the threads that are marked as valid until another exit condition (i.e., instruction stream completion) is reached by one of the threads. This may be repeated until all of the threads are invalid, indicating that all of the threads have completed their respective instruction streams, at which point the simulation is complete and control returns to the host.

Embodiments described herein can be utilized to reduce hypervisor management overhead in a MT environment. As described herein, the management of multiple threads can be split between a hypervisor that manages the multiple threads as a single logical core, and a machine that manages interactions between the multiple threads as they access resources of the physical core. This can result in substantially reducing multithreading (MT) overhead costs by allowing the hypervisor to manage much of the hypervisor infrastructure resources on a logical core basis, and to allow the machine to manage other resources on a more granular, thread basis. An embodiment includes a core dispatch instruction that can be executed by a hypervisor that is running on a single thread (ST). Execution of the core dispatch instruction, referred to herein as a "start-VE instruction with MT specified", can cause multiple guest logical threads that make up all or a portion of a guest virtual machine (VM) to be dispatched on a single physical core. In an embodiment, the instruction used by the hypervisor to dispatch the guest specifies whether the guest to be dispatched is single-threaded or multithreaded.

Embodiments described herein can include structures, such as a thread-validity mask for indicating which logical threads within a guest logical core are currently valid and a state description group that includes a state description ring, for managing the dispatch of a multithreaded logical core. In addition, primary and secondary state descriptions and field types (e.g., primary, core-common, thread specific) can be implemented to allow for the efficient management of the computer resources when a logical core with multiple threads is dispatched. Further, a coordinated exit where all threads within a logical core exit virtual-execution at the same time can be provided to simplify both hypervisor and logical core management functions.

Embodiments can include a control structure maintained by the hypervisor that is referred to herein as a core oriented system control area (COSCA). The COSCA is used by both the hypervisor and the machine to manage certain functions which may affect multiple logical processors in the guest configuration. An embodiment of the COSCA is implemented as a tree structure where the leaves represent logical cores and each leaf contains a list corresponding to the threads of that core. The COSCA structure can contain fields (e.g., state description addresses) that allow the hypervisor to easily access the state descriptions for all of the threads in a particular core.

Embodiments can also include a machine implementation of the core dispatch (e.g., the start-VE instruction with MT specified) where millicode located on the machine can be utilized to manage the core dispatch process.

As used herein, the term millicode is used to refer to Licensed Internal Code which is integral to the operation of processor hardware. Millicode is executed by the machine when it is running in an execution mode, referred to herein as millimode.

When a guest logical core includes multiple threads, one of the logical threads is designated as a primary thread and the rest are designated as secondary threads. The term "primary" applies to the logical thread. A physical thread is neither a primary nor a secondary thread from a hardware perspective; it becomes a primary thread once a start-VE instruction with MT specified is issued on it. The reason for this temporary distinction at the physical level is because when control is passed back to the host, it is typically done on the primary thread, that is, control is passed back to the hypervisor on the same physical thread on which the start-VE was issued.

In an embodiment, millicode can be used to load almost the entire state of any thread (primary or secondary) from any other thread (primary or secondary). In embodiments, the millicode uses this state loading flexibility to load a very small portion of another thread in order to leverage the potential efficiency that can be gained by the parallel loading of its own state by each thread. Some commands (such as purge translation look-aside buffer or "PTLB") and common resources can apply to all threads, and this allows them to be executed or loaded from only a single thread. Not only does this save on the time for the command or the load itself but, in some cases, it also saves on testing required to determine if the action is actually required. This flexibility included in the design can allow millicode to constantly adjust the algorithm used to support core dispatch as the design, development, and test cycle progress. Mechanisms can be provided to efficiently start and stop thread execution. In addition, millicode can also be used to account for the situation where internal firmware is running on a thread which is viewed as invalid at the software level.

Additional embodiments are directed to machine implementation of a coordinated exit from a dispatched MT guest logical core back to a ST host (e.g., a hypervisor). In an embodiment, millicode is used to synchronize the system, and this includes the coordination of all the different threads by taking into account each of their current states. An embodiment can also include the handling of high-priority interruptions while holding lower-priority interruptions which may delay the exit. The shutting down of secondary threads can be done in a way that allows for the most efficient use of the core resources after the exit is complete. For example, the millicode can disable certain interruptions to prevent core resources from being used to dispatch the millicode interruption handler when it is not necessary. Millicode can also be used to indicate that certain physical registers are no longer being used so that they are free for use by the ST that is running.

As used herein, the term "thread" refers to a single instruction stream and its associated state. That is, at an architecture level, each logical thread represents an independent CPU or processor. At a hardware level, a physical thread is the execution of an instruction stream associated with a logical thread, combined with the maintaining of that guest state, when that thread is dispatched. It is the maintaining of that thread state by the machine that reduces the management required at the hypervisor level. The total number of logical threads available for use by logical cores is limited by the total number of physical threads available to the physical cores.

As used herein, the term "physical core" refers to a hardware processing unit that executes one or more independent instruction streams or threads but shares many base resources such as execution units and low-level caches. This sharing can be done a number of ways including by having each thread use the same hardware resources at independent times or by having the resources be logically shared with each physical entry tagged with a thread identifier. Proper synergy between the threads, for example one thread that needs resource A often but resource B only rarely and another thread that typically uses resource B but not resource A, can improve the efficiency of this sharing. As used herein, the term "machine" refers to hardware included in the physical core as well as millicode and other hardware used in support of the physical core.

As used herein, the terms "guest VM" and "guest" are used interchangeably to refer to a single guest configuration which can include a single CPU or multiple CPUs. As used herein, the term "logical core" refers to the group of logical guest threads or CPUs that are defined to be dispatched together as part of a start-VE instruction where MT is specified. A guest VM can be made up of a single logical core (either ST or MT) or multiple logical cores (also each of which can be ST or MT).

As used herein, the term "software" refers to either the hypervisor program (e.g. PR/SM or zVM) or the guest operating system or application program which is dispatched as a result of the start-VE instruction.

As used herein, the terms "hypervisor" and "host" refer to the program which manages the system resources and dispatches the guest logical processor(s) to run on the physical hardware.

Figure 12:
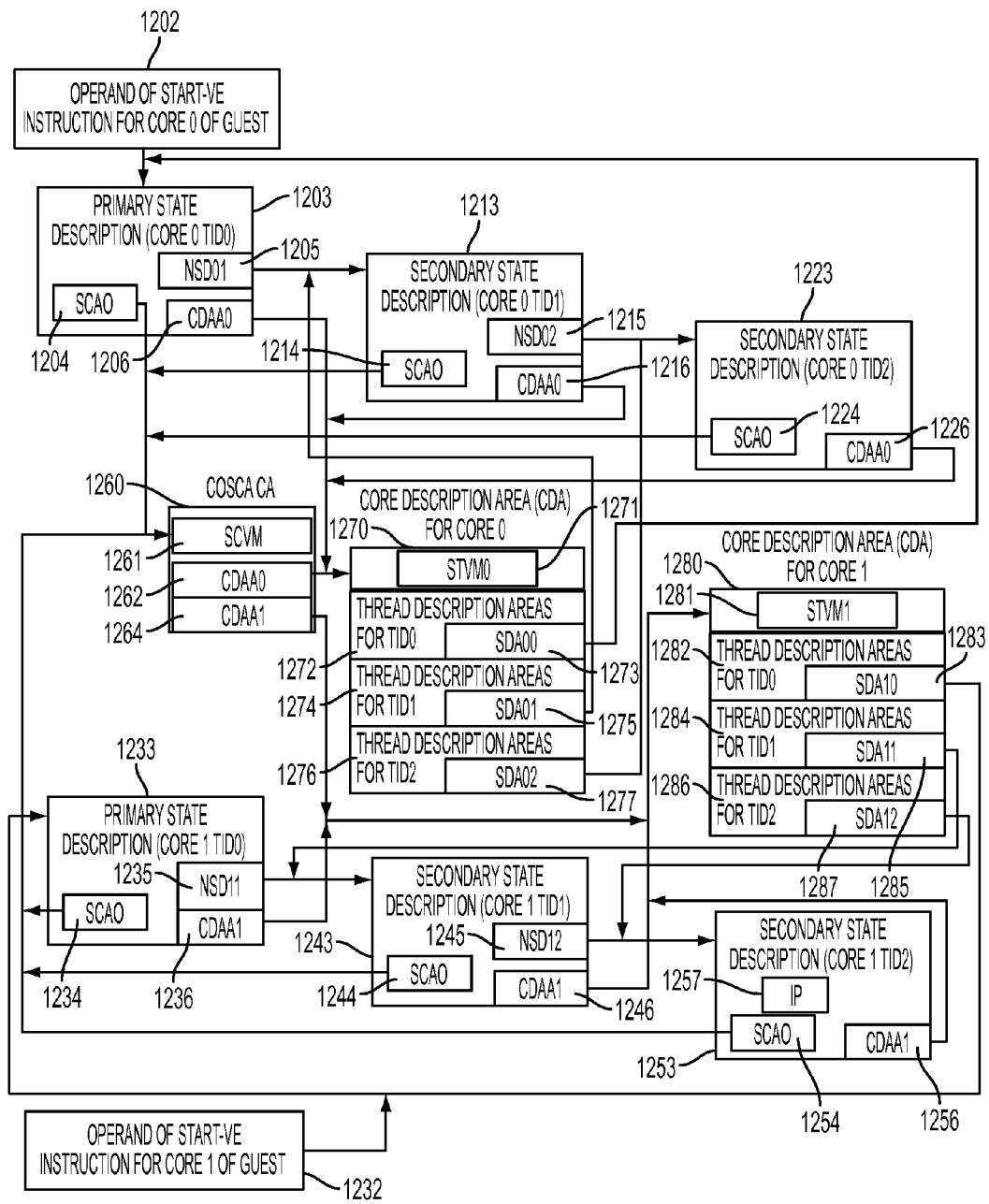
FIG. 12 depicts a block diagram of a system control area in accordance with an embodiment.

The operand of the start-VE instruction used to dispatch a guest points to a state description or group of state descriptions which defines the state of that guest processor or core. The state description itself has pointers to "satellite blocks" which can be viewed as an extension to the state description and include additional information which further defines the state of that guest core or processor. As used herein, the term "state description" refers not only to the state description itself but also to those satellite blocks. The core-oriented system control area (COSCA), one of these satellite blocks, is depicted in FIG. 12.

Turning now to FIG. 1, a computing environment 100 that may be implemented by an exemplary embodiment is generally shown. Computing environment 100 can be based, for example, on the z/Architecture offered by International Business Machines Corporation, Armonk, N.Y. The z/Architecture is described in an IBM® publication entitled, "z/Architecture Principles of Operation," IBM Publication No. SA22-7832-09, August 2012, which is hereby incorporated herein by reference in its entirety. In one example, a computing environment based on the z/Architecture includes an IBM System z, offered by International Business Machines Corporation, Armonk, N.Y.

As one example, computing environment 100 can include a processor complex 102 coupled to a system controller 120. Processor complex 102 can include, for example, one or more partitions 104 (e.g., logical partitions LP1-LPn), one or more physical cores 106 (e.g., Core 1-Core m), and a level-0 hypervisor 108 (e.g., a logical partition manager), each of which is described below.

Each logical partition 104 can be capable of functioning as a separate system. That is, each logical partition 104 can be independently reset, initially loaded with an operating system 110, if desired, and operate with different programs. An operating system 110 or application program running in a logical partition 104 can appear to have access to a full and complete system, but in reality, only a portion of it is available. A combination of hardware and Licensed Internal Code (commonly referred to as microcode or millicode or firmware) keeps a program in one logical partition 104 from interfering with a program in a different logical partition 104. This allows several different logical partitions 104 to operate on a single or multiple physical cores 106 in a time sliced manner. In an embodiment, each physical core includes one or more central processors (also referred to herein as "physical threads"). In the example shown in FIG. 1, each logical partition 104 has a resident operating system 110, which may differ for one or more logical partitions 104. The operation system 110 running in each logical partition 104 is an example of a virtual machine or guest configuration. In one embodiment, operating system 110 is the z/OS® operating system, offered by International Business Machines Corporation, Armonk, N.Y.

Physical cores 106 include physical processor resources that are allocated to the logical partitions 104. A logical partition 104 can include one or more logical processors, each of which represents all or a share of the physical processor resources allocated to the partition 104. The physical cores 106 may be either dedicated to the logical cores of a particular partition 104, so that physical processor resources of the underlying core(s) 106 are reserved for that partition 104; or shared with the logical cores of another partition 104, so that physical processor resources of the underlying core(s) resources are potentially available to another partition 104.

In the embodiment shown in FIG. 1, the logical partitions 104 are managed by level-0 hypervisor 108 which is implemented by firmware running on physical cores 106. Logical partitions 104 and hypervisor 108 each comprise one or more programs residing in respective portions of central storage (memory) associated with the physical cores 106. One example of hypervisor 108 is the Processor Resource/Systems Manager (PR/SM™), offered by International Business Machines Corporation, Armonk, N.Y.

System controller 120, which in FIG. 1 is coupled to the central processor complex 102, can include centralized logic responsible for arbitrating between different processors issuing requests. For instance, when system controller 120 receives a memory access request, it determines if access to that memory location is allowed and, if so, provides the contents of that memory location to the central processor complex 102 while maintaining memory consistency between processors within that complex.

Figure 2:
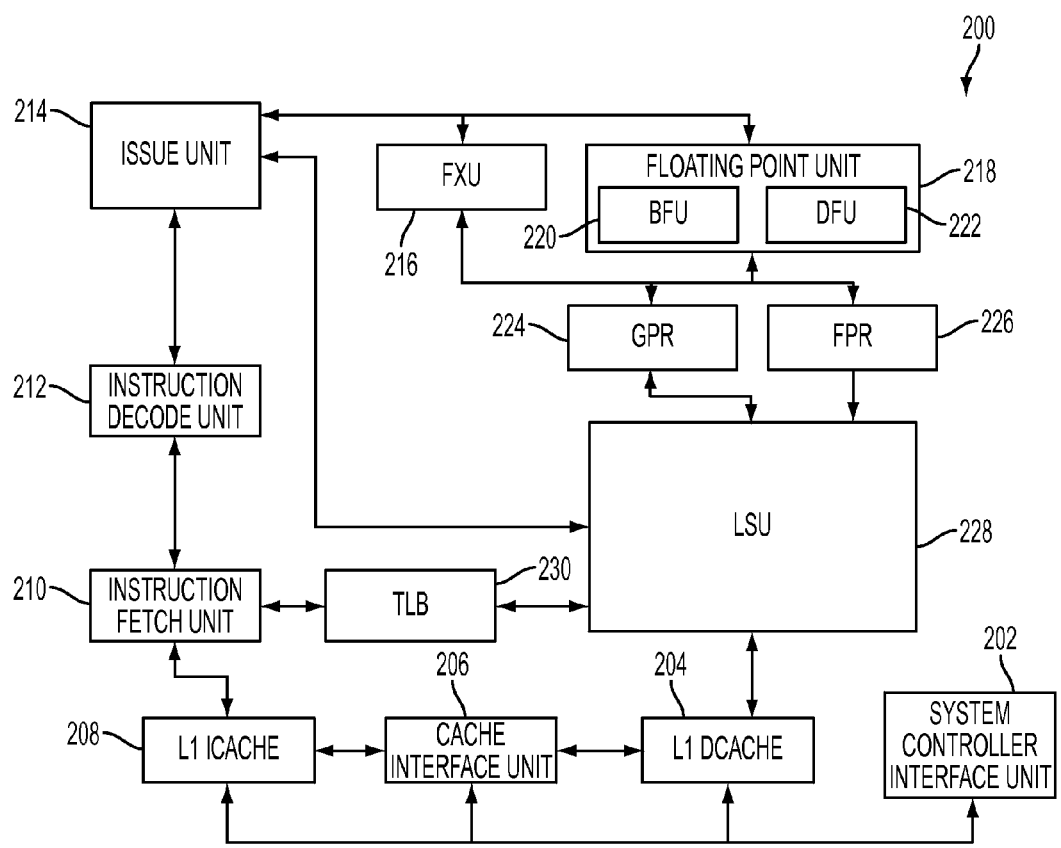
FIG. 2 depicts a physical processor that may be implemented in accordance with an embodiment.

Turning now to FIG. 2, a block diagram of a processing circuit 200 for implementing a machine or physical core, such as physical core 106 in FIG. 1, is generally shown in accordance with an embodiment. The processing circuit 200 can include one physical core of a plurality of physical cores in a multi-processing environment. The processing circuit 200 shown in FIG. 2 includes a system controller interface unit 202 that can couple the processing circuit 200 to other cores and peripheral devices. The system controller interface unit 202 can also connect Dcache 204, which reads and stores data values, Icache 208, which reads program instructions, and a cache interface unit 206 to external memory, processors, and other peripheral devices.

The Icache 208 can provide loading of instruction streams in conjunction with an instruction fetch unit (IFU) 210, which pre-fetches instructions and may include speculative loading and branch prediction capabilities. The fetched instructions can be provided to an instruction decode unit (IDU) 212 for decoding into instruction processing data.

The IDU 212 can provide the instructions to an issue unit 214 which can control the issuing of the instructions to various execution units, such as one or more fixed point units (FXU) 216 for executing general operations and one or more floating point units (FPU) 218 for executing floating point operations. The FPUs 218 can include a binary floating point unit (BFU) 220, a decimal floating point unit (DFU) 222, or any other floating point unit. The issue unit 214 can also be coupled to one or more load/store units (LSU) 228 via one or more LSU pipelines. The multiple LSU pipelines are treated as execution units for performing loads and stores and address generation for branches. Both the LSU 228 and the IFU 210 can utilize a translation-lookaside-buffer (TLB) 230 to provide buffered translations for the operand and instruction addresses.

The FXU 216 and FPU 218 are coupled to various resources such as general-purpose registers (GPR) 224 and floating point registers (FPR) 226. The GPR 224 and FPR 226 provide data value storage for data values loaded and stored from the Dcache 204 by a LSU 228.

Figure 3:
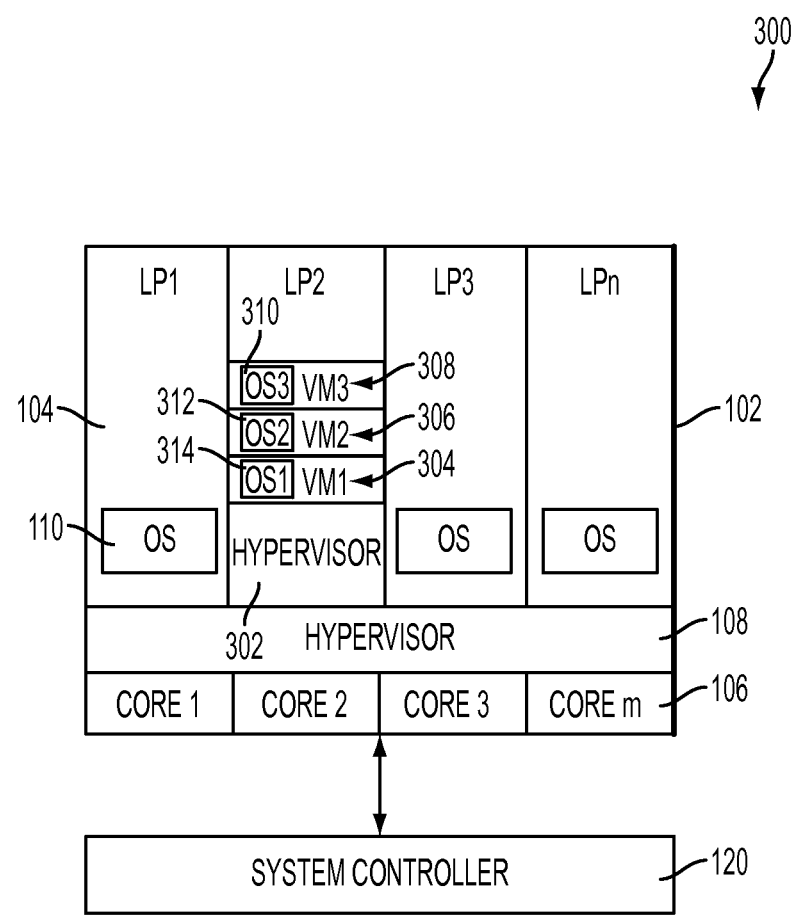
FIG. 3 depicts a computing environment that may be implemented in accordance with an embodiment.

Turning now to FIG. 3, a computing environment 300 that may be implemented by an embodiment is generally shown. The computing environment 300 shown in FIG. 3 is similar to the computing environment 100 shown in FIG. 1 with the addition of a level-1 hypervisor 302 executing in the logical partition 104 labeled LP2. As shown in FIG. 3, the level-1 hypervisor 302 can provide the same hypervisor functions described previously with respect to hypervisor 108 (also referred to herein as a "level-0 hypervisor"), such as transparent time-slicing of resources between multiple operating systems (e.g. OS1 314, OS2 312, and OS3 310 running in virtual machines VM1 304, VM2 306, and VM3 308) and isolation of those operating systems from one another, within the logical partition 104 labeled LP2. The embodiment shown in FIG. 3 includes three virtual machines as an example and other embodiments may include more or fewer virtual machines based on application requirements.

As shown in FIG. 3, the logical partition 104 labeled LP1 has a resident operating system 110, and the logical partition 104 labeled LP2 runs a level-1 hypervisor 302 which in turns creates virtual machines 304 306 308 each of which runs its own resident operating systems 314 312 310. Any number of the logical partitions 104 may run a level-1 hypervisor 302. In an embodiment, the level-1 hypervisor 302 is the z/VM hypervisor, offered by International Business Machines Corporation, Armonk, N.Y. The resident operating systems running in the various logical partitions may differ and, when running under a level-1 hypervisor 302, the resident operating systems (e.g., operating systems 314 312 310) within a single partition 104 (e.g., LP2) may also differ. In an embodiment, operating system 110 in the logical partition 104 labeled LP1 is the z/OS operating system, which is offered by International Business Machines Corporation, Armonk, N.Y. In an embodiment, operating systems 310 and 312 are Linux and operating system 314 is z/OS.

When a level-1 hypervisor 302 is running in a logical partition 104 it can provide the same virtualization of resources provided by a level-0 hypervisor, such as hypervisor 108, to logical partitions 104 to the operating systems 310 312 314 running in virtual machines 308 306 304. As at the first level, each virtual machine may include multiple virtual processors.

Physical cores 106 include physical processor resources that can be dedicated or shared, as described for FIG. 1, between the logical partitions 104 LP1, LP2, LP3 and LP4. When logical partition LP2 is dispatched on one or more physical cores, the level-1 hypervisor 302 can then transparently share those resources between its virtual machines VM1 304, VM2 306 and VM3 308. In one embodiment, level-0 hypervisor 108 uses a start-VE instruction with MT specified to dispatch a multithreaded level-1 hypervisor 302 which then uses a start-VE instruction with ST specified to dispatch single-threaded virtual machines VM1 304, VM2 306 and VM3 308. In a different embodiment, level-0 hypervisor 108 uses a start-VE instruction with ST specified to dispatch a single threaded level-1 hypervisor 302 which then uses a start-VE instruction with MT specified to dispatch multithreaded virtual machines VM1 304, VM2 306 and VM3 308. In another embodiment both level-1 hypervisor 302 and its guest VMs 304 306 308 are all single-threaded.

In a guest multiprocessing (MP) environment, the hypervisor can maintain a control structure, known as the system control area (SCA), which is used by both the hypervisor and the machine to manage certain functions which may affect multiple logical processors in the guest configuration. The same SCA origin (SCAO) is specified in the state description for all the guest processors in the configuration or virtual machine. In an embodiment, this area can include a common area (used, in general, to coordinate guest-configuration-wide functions) and separate, processor-specific entries. The common area, for example, holds information about which virtual processors within the guest configuration are valid. The separate, processor-specific area within the SCA can, for example, be used to interpret or emulate inter-processor guest functions such as an inter-processor interruption or to provide easily accessible pointers to each logical processor's respective state description. In an embodiment the SCA used for ST is extended for MT use by adding additional thread-specific entries for each potential guest thread.

An embodiment of a core dispatch can allow a hypervisor that is running on a single thread to dispatch a multithreaded guest on its core using a variation of the start-VE instruction, sometimes referred to as start multithreaded virtual-execution (start-MVE). Each thread in the multithreaded guest can represent a guest logical central processing unit (CPU), or guest thread. The start-VE instruction can enable multithreading (MT) guest execution on the physical core, via a control field in the state description. The operand of the start-VE instruction when used for core dispatch can specify either a single state description which contains the state of all the guest threads or a group of state descriptions each of which, for example, represents the state of a single guest thread. In an embodiment, the logical core includes this group of state descriptions. Core dispatch requires virtual-execution entry to load the state of the logical core and each of these guest logical threads into a physical core thread and its threads. These threads can be instruction streams which operate independently from one another. In various embodiments, a group of state descriptions can be specified a number of ways including as fixed offsets from one another, as a list of state description addresses or state descriptions, or as a circular list (ring) of state descriptions that applies to the core with each state description in that group representing a separate guest thread. Such techniques allow for easy access by the hypervisor and the machine to other threads within the logical core and allow for fields which apply to the entire logical core to be maintained in a single place.

The guest OS can make use of multithreading simply by issuing an MT-setting instruction which enables multithreading in the guest. This allows the guest OS to treat these new threads as additional, independent CPUs and manage them as it would in the absence of multithreading. In addition, the guest OS may use these threads in a way that leverages the fact that they share a core or it can have them operate in a more interdependent manner. This is all transparent to the hypervisor and the machine. The hypervisor then provides these additional threads to the guest OS while the hypervisor itself continues to run on a single thread per core and to manage much of the guest MT environment on a core basis In an embodiment of core dispatch, the state description which is specified as the operand of the start-VE instruction with MT specified is a "primary" state description and the associated guest logical thread is the "primary" thread. The other state descriptions in the group are referred to herein as "secondary" state descriptions and, if applicable, apply to secondary logical threads. When the state description group is implemented as either a list or a ring, there can be a next-state-description (NSD) field in the primary state description that points to the first secondary state description which in turn, either 1) points to the next secondary state description in the group or 2) contains a value to indicate the end of a group. The NSD value in the state description for the last in the list may be the address of the primary state description in which case the list forms a ring of state descriptions.

In a non-MT implementation, the hypervisor dispatches one guest logical processor (also referred to herein as a "logical thread") on a given physical core at a time. If a particular logical processor is in an invalid state, for example, in the stopped state or in a disabled wait, the hypervisor will not dispatch that guest. In an MT environment, the core dispatch allows the hypervisor to dispatch multiple guest threads on the core at the same time. In order to accommodate the possibility that one or more of the threads in that logical core's state-description group is invalid, an embodiment utilizes a thread-validity mask (TVM) in the primary state description, each bit of which indicates the validity, from a software perspective, of the logical thread in the corresponding state description in the group.

In another embodiment, only valid threads are included in the state description group and no validity indication is necessary. An embodiment which includes invalid logical threads in the state description group allows the hypervisor to maintain the state associated with these invalid threads and these threads may become valid again in the future. The machine will only initialize and run those threads which have a valid state. The hypervisor will only dispatch a guest logical core if at least one thread in the group is valid.

Figure 4:
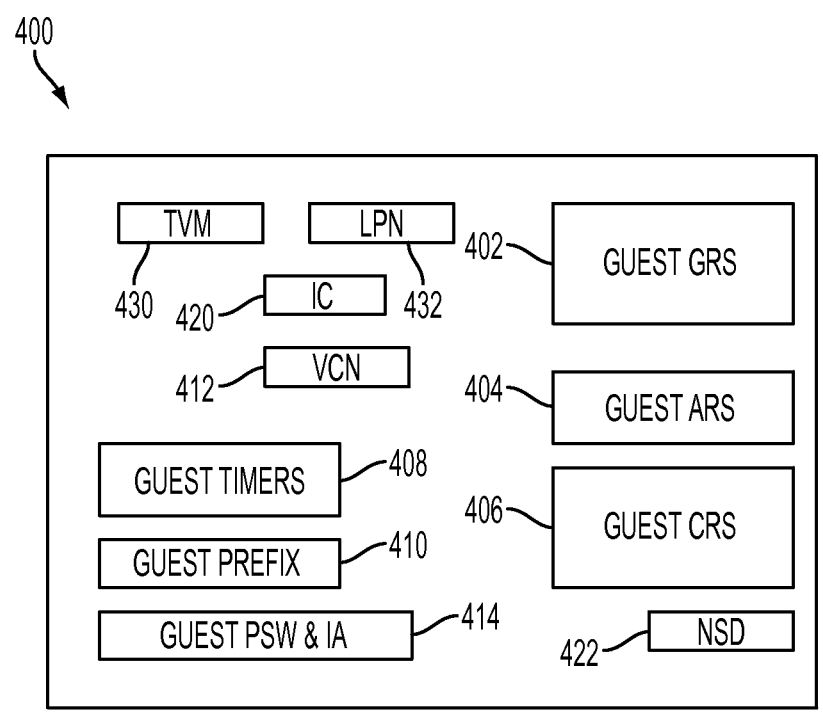
FIG. 4 depicts a state description of a multithreaded (MT) logical thread in accordance with an embodiment.

Turning now to FIG. 4, a state description of a logical thread that includes most of the architected state of the guest is generally shown in accordance with an embodiment. In this context, the term "state description" includes not only the state description itself but also the satellite blocks, whose pointers reside in the state description, that act as an extension. As shown in FIG. 4, the state description 400 can include the guest general registers (GRs) 402, access registers (ARs) 404, control registers (CRs) 406, guest timers 408 (including clock comparator and CPU timer), guest prefix register 410, virtual CPU number (VCN) 412, program-status word (PSW) and instruction address (IA) 414. In addition, it can include control information such as interception control (IC) bits 420 to indicate if certain instructions (e.g., Load Program Status Word (LPSW) and Invalidate Page Table Entry (IPTE)) require interception to the host or if purging of the guest translation lookaside buffer (TLB) is required before guest instruction execution can begin. The state description also contains the next-state-description address (NSD) 422 which is used to define state description lists and rings as described in FIGS. 6-9. The primary state description also includes the TVM 430 as described in FIG. 5 and the logical-partition number (LPN) 432. The virtual CPU number (VCN) 412 is equivalent to the CPU number, potentially adjusted to include the thread number in MT mode.

Threads within a core may be identified by a binary thread identification (TID). For brevity in the below figures, thread x is often referred to by the term TIDx, in which case the meaning is "the thread having TID x".

Figure 5:
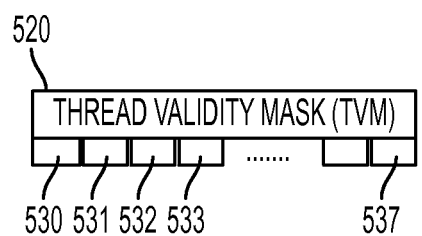
FIG. 5 depicts a block diagram of a thread-validity mask (TVM) in accordance with an embodiment.

Referring now to FIG. 5, a block diagram of a thread-validity mask (TVM) 520 is generally shown in accordance with an embodiment. As shown in FIG. 5, bit 0 530 of the TVM 520 represents the validity of logical thread 0 in the state description group, bit 1 531 represents the validity of thread 1, bit 2 532 represents the validity of thread 2, bit 3 533 represents the validity of thread 3 and so forth until bit n 537 which represents the validity of thread n, the last possible logical thread in the state description group associated with this core. The TVM can reside in the primary state description for the group.

Figure 6:
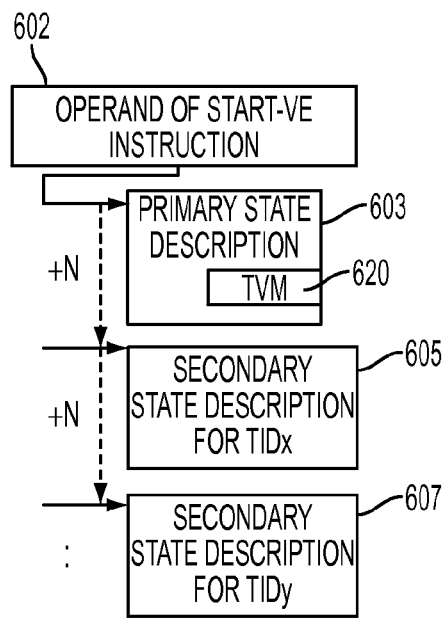
FIG. 6 depicts a fixed offset state description group in accordance with an embodiment.

Turning now to FIG. 6, a fixed offset state description group structure is generally shown in accordance with an embodiment. As shown in FIG. 6, the state description group is specified at fixed offsets (N) from one another. In this case, the operand of the start-VE instruction 602 points to the primary state description 603 for logical thread 0. The secondary state description for logical thread x 605 is located at a fixed offset of N bytes after the primary state description and the secondary state description for logical thread y 607 is located N bytes after the secondary state description for thread x. This continues for all the threads in the group. The number of threads in the group can be determined a number of ways including by a count in the primary state description or by an end marker following the last state description address in the list.

FIG. 6 can represent two cases, the first case being where the group includes state descriptions for all logical threads in the group, whether they are valid or not, and the second case being where only valid state descriptions are included in the group. In the first case, the state description for thread x 605 represents the state of thread 1 and that for thread y 607 represents the state of thread 2. The TVM 620, which is only needed in this first case, represents the validity of each of these logical threads. In the second case, the state description for thread x 605 represents the state of the first valid logical secondary thread and the state description for logical thread y 607 represents the state of the second valid secondary thread. For example, if thread 1 is not valid and threads 2 and 3 are both valid, then thread x 605 would represent thread 2 and thread y 607 would represent thread 3. There would be no state description included in the group for thread 1 since it is invalid. These same two cases can also apply to the embodiments shown in FIGS. 7-9 below, however only case 1 is described and pictured.

Figure 7:
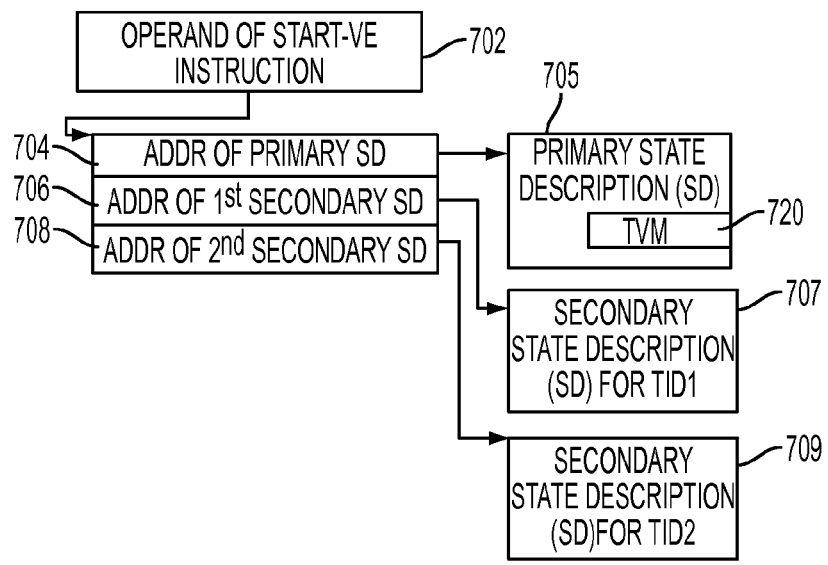
FIG. 7 depicts a state description group specified as an address list in accordance with an embodiment.

Turning now to FIG. 7, a state description group structure specified as a list is generally shown in accordance with an embodiment. In this case, the operand of the start-VE instruction 702 represents a list of state description addresses with the first entry in the list 704 pointing to the primary state description 705 for thread 0, the second entry in the list 706 pointing to the secondary state description for thread 1 707, the third entry in the list 708 pointing to the secondary state description for thread 2 709, and so on, continuing for all threads in the group. The TVM 720 represents the validity of each of these threads.

Figure 8:
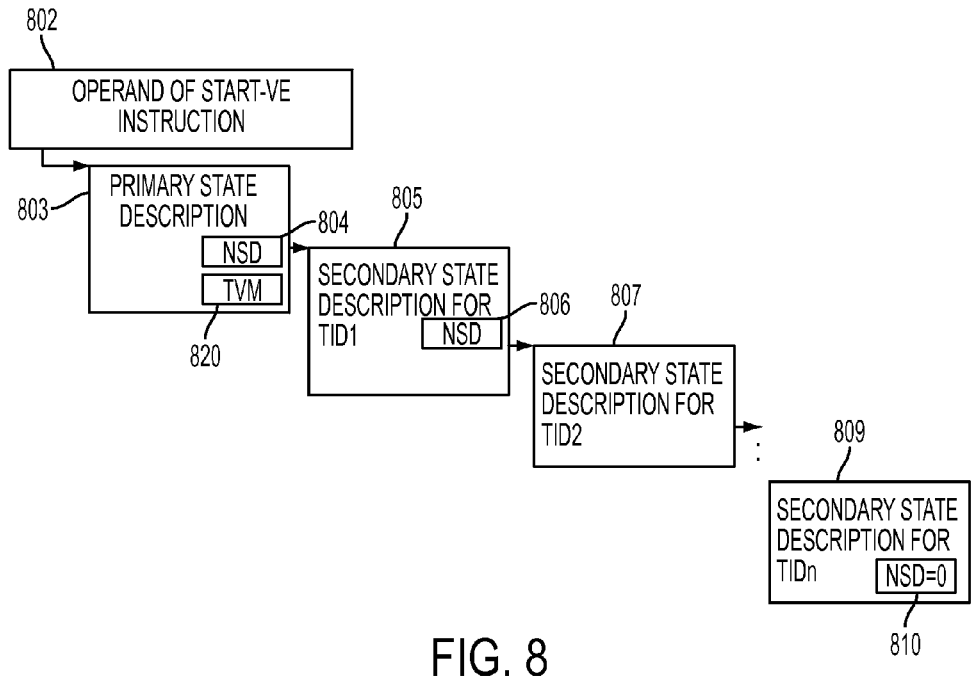
FIG. 8 depicts a state description group specified as a linked list in accordance with an embodiment.

Turning now to FIG. 8, a state description group structure specified as a linked list is generally shown in accordance with an embodiment. In this case, as in the case depicted in FIG. 6, the operand of the start-VE instruction 802 points to the primary state description for thread 0 803 but, instead, the pointer 804 for the secondary state description for thread 1 805 is provided as a next state description (NSD) field 804 in the primary state description. In turn, the pointer 806 for the secondary state description for thread 2 807 is provided as an NSD 806 in the secondary state description for thread 1. This would continue for all threads in the group with the NSD 810 in the state description for the last thread n 809 being specified as zeroes or some other unique value indicating the end of the list. The TVM 820 provided in the primary state description 803 represents the validity of each of these threads.

Figure 9:
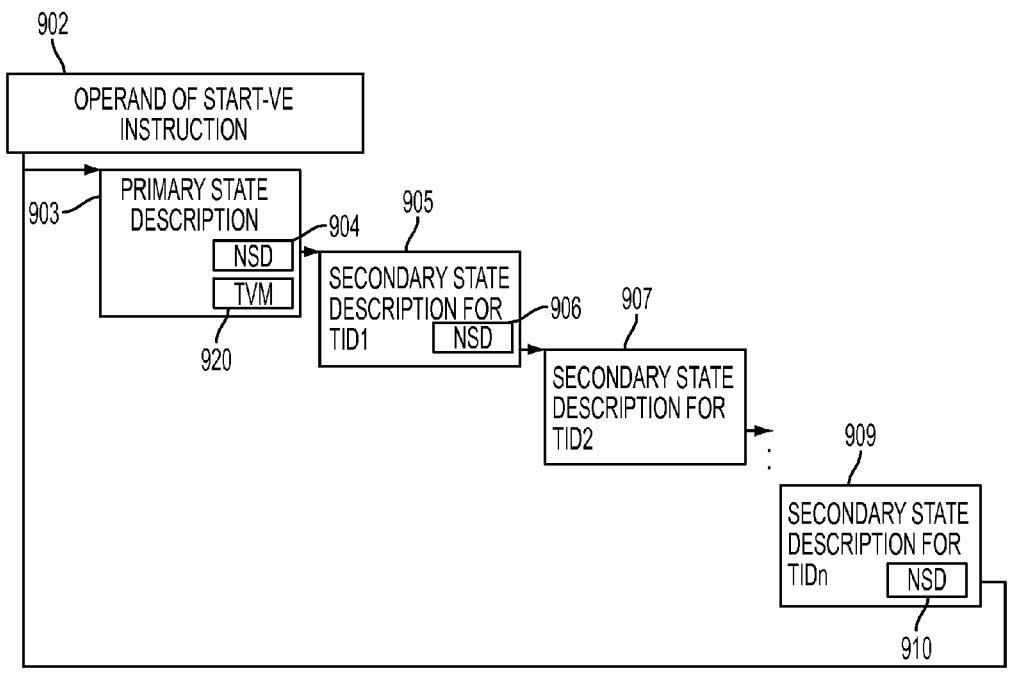
FIG. 9 depicts a state description group specified as a circular list or ring in accordance with an embodiment.

Turning now to FIG. 9, a state description group structure specified as a circular list or ring is generally shown in accordance with an embodiment. This case is identical to the case shown in FIG. 8 in that the operand of the start-VE instruction 902 points to the primary state description 903 for thread 0, which contains an NSD 904 for the secondary state description for thread 1 905, which contains an NSD 906 for the secondary state description for thread 2 907 and this continues for all threads up to the last thread n. In the embodiment shown in FIG. 9, however, the NSD 910 in the state description for thread n 909 forms a circular list and points back to the primary state description 903. The TVM 920 provided in the primary state description 903 represents the validity of each of these threads.

The core dispatch allows the hypervisor to manage many aspects of the logical threads at the core level. Core dispatch not only often simplifies the hypervisor code required for thread management by pushing the coordination of virtual-execution of multiple threads of a core into the machine, but it can also reduce the overhead required for managing more processors in the configuration. Priority management for logical partitions (or guests) can continue to be done at the logical core level, reducing scaling pressure on this type of management. The hypervisor itself still needs to manage the collection of threads associated with a logical core to make sure its needs (such as instruction interceptions) are all met before reissuing the start-VE instruction.

Figure 10:
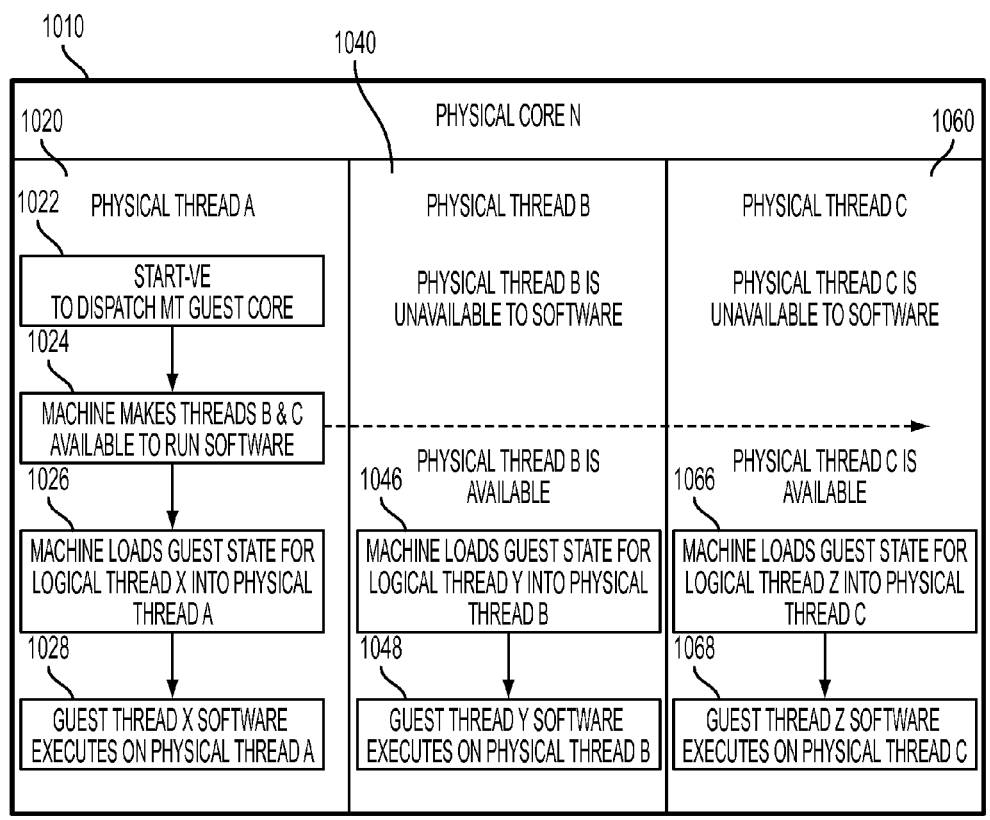
FIG. 10 depicts a core dispatch process in accordance with an embodiment.

Referring now to FIG. 10, a core dispatch process in accordance with an embodiment is generally shown. As shown in FIG. 10, a hypervisor is running single-threaded on physical core N 1010 and physical thread A 1020. In block 1022, the hypervisor issues the start-VE instruction with MT specified to dispatch the multithreaded guest core. The machine determines that the guest is multithreaded and, in block 1024, makes physical threads B and C available to run software. The machine loads the guest state from the state description for each of the threads into a corresponding physical thread. In the embodiment depicted in FIG. 10, the machine uses multiple physical threads to perform this function, that is, millicode running on physical thread A 1020 loads the state of guest logical thread X into physical thread A, as shown in block 1026. Likewise, millicode running on physical threads B 1040 and C 1060 load the state of guest logical threads Y and Z into physical threads B and C as shown in blocks 1046 and 1066. Once the guest state is loaded, the software running on guest logical threads X, Y, and Z executes on physical threads A, B, and C as shown in blocks 1028, 1048 and 1068.

Figure 11:
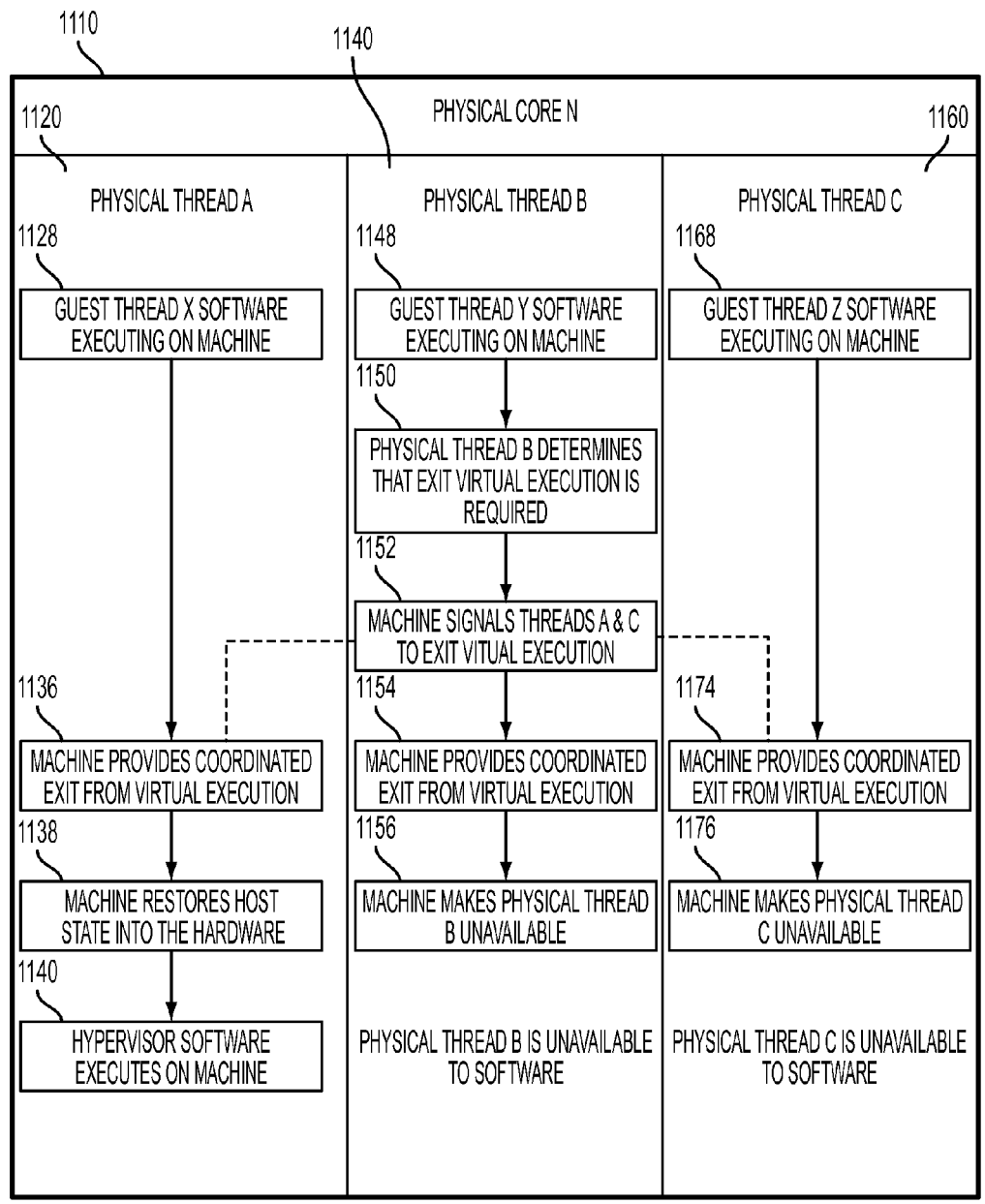
FIG. 11 depicts a coordinated exit from virtual-execution in accordance with an embodiment.

Referring now to FIG. 11, a coordinated exit from virtual-execution is generally shown in accordance with an embodiment. As shown in FIG. 11, guest logical threads X, Y and Z are executing guest software on physical threads A 1120, B 1140, and C 1160 as indicated in blocks 1128, 1148 and 1168. One or multiple guest threads determine that an exit from virtual-execution is required. Referring to FIG. 11, guest logical thread Y running on physical thread B 1140 determines that it must exit virtual-execution, as shown in block 1150, causing the machine to signal physical threads A 1120 and C 1160 to exit virtual-execution, as shown in block 1152. In blocks 1136, 1154 and 1174, millicode running on each of the physical threads coordinates the exit from virtual-execution and then makes physical threads B 1140 and C 1160 unavailable for use by software as indicated in blocks 1156 and 1176. Millicode on physical thread A 1120 reloads the host state into the hardware as shown in block 1138 which results in the execution of the hypervisor software on physical thread A as shown in block 1140. The hypervisor will then process any pending guest interceptions and host interruptions as needed.

FIG. 12 depicts a block diagram of a core-oriented system control area (COSCA) for a single guest configuration that includes multiple logical cores in accordance with an embodiment. The COSCA shown in FIG. 12 can be used to provide coordination both between logical threads within a core and between logical threads on different cores. The COSCA can include a common area representing the entire guest configuration with pointers, one for each logical core, to separate core-description areas. Each core-description includes a common area representing that core and a series of contiguous, separate, thread-specific areas or thread descriptions for that core. In another embodiment the core description provides the locations of the thread descriptions. The provided locations may be implied (e.g., they are a list contained in the core description, or they may be in memory blocks that are consecutive to the core description). In other embodiments, pointers to other memory locations containing the thread descriptions may be provided. As used herein, the term "indicates a location" is used to refer to any of these, or any additional manner, of determining a location of an item (e.g., the thread descriptions or other elements in the COSCA). This structure maintains the tree-like representation of the MT guest configuration which facilitates in some situations, particularly at the hypervisor level, things to be managed on a core basis but in other situations things to be managed on a thread or processor basis.

The same COSCA origin (COSCAO) can be provided in the SCA origin (SCAO) field in the state descriptions for all the guest threads within the guest configuration and the same core-description area address (CDAA) can be provided for all threads within a given core. An advantage of this embodiment is that it does not require as much contiguous real storage which can be difficult for some hypervisors to provide. Another embodiment could add an additional level of indirection and have each core description include a list of pointers for each thread-specific area removing the need for the control blocks containing these areas to be contiguous.

Referring now to FIG. 12, an example embodiment of a COSCA for a single guest configuration which includes two logical cores with three logical threads in each core is generally shown. In an embodiment the COSCA includes the contents of the COSCA common area 1260 (shown in FIG. 12 as "COSCACA 1260"), core description area 1270, and core description area 1280. The primary state description for the state description group associated with logical core 0 1203 is specified as the operand of the start-VE instruction used by the hypervisor to dispatch guest core 0 1202. In addition, the primary state description for the state description group associated with logical core 1 1233 is specified as the operand of the start-VE instruction used to dispatch core 1 1232. This primary state description for "core 0 thread 0" 1203 contains NSD01 1205, which points to the secondary state description for core 0 thread 1 1213 which, in turn, contains NSD02 1215, which points to the final secondary state description for core 0 thread 2 1223 in the group. Similarly, the state description group for logical core 1 begins with the primary state description for core 1 thread 0 1233 containing NSD11 1235, which points to the secondary state description for core 1 thread 1 1243 containing NSD12 1245, which points to the final secondary state description for core 1 thread 2 1253. The state descriptions for all six threads in this guest configuration 1203 1213 1223 1233 1243 1253 contain the same value in SCAO 1204 1214 1224 1234 1244 1254, pointing to COSCA common area 1260.

The COSCA common area 1260, as shown in FIG. 12, contains core-level information used to coordinate guest configuration-wide functions. The COSCA common area 1260 includes an SCA core validity mask (SCVM) 1261 which indicates the validity of each logical core within the guest configuration and also includes a core-description area address (CDAA) for each core 1262 1264. Both the bits in the SCVM and the array of core-description addresses may be indexed by the core number. CDAA0 1262, which points to the core description area (CDA) for core 0 1270, is included in the COSCA common area 1260. Additionally, the CDAA field in the state descriptions for all threads in core 0 1206 1216 1226 also point to the CDA for core 0 1270. CDAA1 1264, which points to the CDA for core 1 1280, is also included in the COSCA common area 1260, and likewise the CDAA field in the state descriptions for all the threads in core 1 1236 1246 1256 also point to the CDA for core 1 1280. The core description area (CDA) for core 0 1270 contains an SCA thread validity mask (STVM0) 1271 which indicates the validity of each logical thread within core 0. It also contains the thread description areas for core 0 thread 0 1272, thread 1 1274, and thread 2 1276. The CDA for core 1 1280, similarly contains STVM1 1281 and the thread description areas for core 1 thread 0 1282, thread 1 1284, and thread 2 1286). Each of these thread description areas 1272 1274 1276 1282 1284 1286 contain a state description address (SDA) 1273 1275 1277 1283 1285 1287 for the thread corresponding to that thread description area, core 0 thread 0, core 0 thread 1, core 0 thread 2, core 1 thread 0, core 1 thread 1, and core 1 thread 2, respectively. Both the bits in the STVM and the array of thread description areas may be indexed by the thread identification. These SDAs make it easier for the hypervisor to manage threads within a core and for the machine to present guest inter-processor interruptions.

Figure 13:
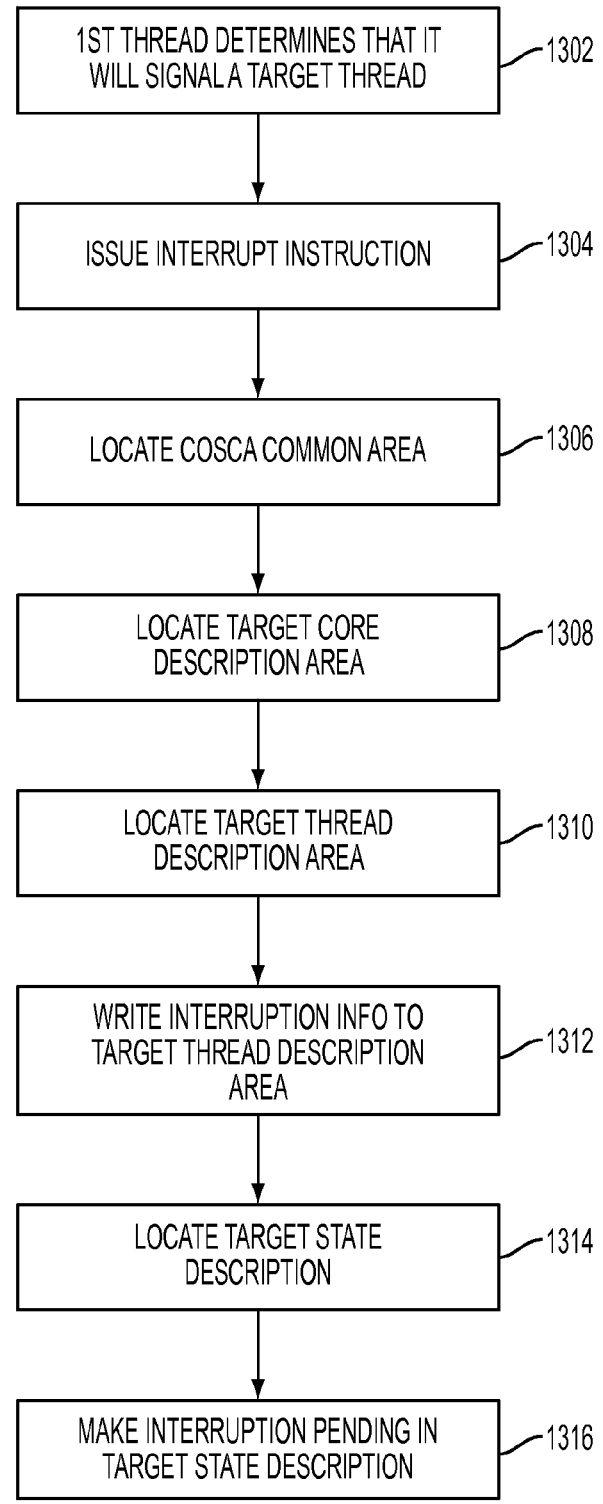
FIG. 13 depicts a process flow for coordinating between multithreaded cores in accordance with an embodiment.

FIG. 13 depicts a process flow for managing multithreaded cores in accordance with an embodiment that uses the COSCA shown in FIG. 12. In the example shown in FIG. 13, at block 1302, a guest operating system (OS) running on a first physical thread (e.g., core 0 thread 1 defined by state description 1213) has determined that it will signal a second logical thread, or target thread, (e.g., core 1 thread 2 defined by state description 1253). At block 1304, the guest OS does this, for example, by issuing an inter-processor-interrupt instruction. The machine, as part of executing the inter-processor-interrupt instruction, uses the COSCA to emulate the guest inter-processor-interrupt instruction. The inter-processor-interrupt instruction is emulated by the machine since the logical core that includes the target logical thread may or may not be dispatched at the time the signaling is being done. At block 1306, the machine locates (e.g., via SCAO 1214 since the inter-processor-interrupt instruction was executed by logical core 0 thread 1) a common area (e.g., COSCA common area 1260) for the guest configuration in order to access an SCVM (e.g., SCVM 1261) to verify the validity of the target core and to obtain the appropriate CDAA (e.g. CDAA1 1264 since the target thread is on core 1).

Next, at block 1308, the machine locates (e.g., via CDA1 1264) the core description area for the target core (e.g., CDA 1280). The machine verifies that the target thread is valid by accessing an STVM in the core description area (e.g., STVM1 1281 in CDA 1280). At block 1310, the machine locates the thread description area (e.g. thread description area 1286 corresponding to thread 2 since the target thread is thread 2). At block 1312, information about the interruption is recorded in the thread description area for the target thread (e.g., it places the identity of the sending thread into thread description area 1286). At block 1314, the machine locates (e.g. via SDA12 1287 in thread description area 1286) the state description for the target thread (e.g. secondary state description for core 1 TID2 1253). At block 1316, the interruption is made pending in the target state description (e.g., the IP bit 1257 is set in state description for core 1 TID2 1253). As a result, when the target logical processor (e.g. core 1 thread 2) is dispatched on a physical thread and is enabled for the interruption, the machine will present the interruption, if enabled, to the guest operating system. If the target logical processor is already dispatched at the time that the interruption becomes pending, it will take the interruption once it is enabled.

There are instances where the machine can also make use of the fact that threads within a logical core have attributes in common. For example, core dispatch naturally lends itself to having all guest threads on a logical core reside in the same LPAR zone or partition. The design can minimize hardware by only having to implement things associated with the zone once per core instead of once per thread. In addition, complicated control logic (handling of system-wide interruptions, for example) can also be simplified since it must only deal with a single core value.

In one embodiment, each field (or bit within a field) in the group of state descriptions representing a multithreaded guest is classified as primary, core-common, or thread-specific. A primary field resides only in the primary state description and applies to all processors in the logical core; any access made to a primary field on behalf of any thread of a core must use the value from the associated primary state description. This classification is used for fields which define the overall state of the core, such as the thread-validity mask. A core-common field is common among all processors within a logical core and this field has the same value in every state description in the group; any access made to one of these fields on behalf of a processor may use the value from any state description in the group. This classification is used for fields that apply across the entire core, such as the LP number. The hypervisor is required to maintain the core-common fields in all the state descriptions but the machine is allowed to access this field in the state description of any thread, whichever provides the best performance. Since these fields are not often changed by the hypervisor but are often accessed by the machine on every entry into virtual-execution, defining a field as core-common rather than thread-specific allows virtual-execution entry, for example, to load a secondary thread facility from the primary thread using the value in the primary state description. A thread-specific field is specific to each logical thread; any access made to one of these fields on behalf of any given thread must use the value from that thread's state description.

This classification is used for fields that are typically unique between threads, such as the guest prefix.

An embodiment includes a machine implementation of the core dispatch instruction. When a hypervisor issues a core dispatch, or start-VE instruction with MT specified, the logical core that is described by the associated state description group is loaded into a physical core by the virtual-execution-entry (VE-entry) millicode. As part of this process, the state of each valid logical thread is loaded into a physical thread. The mapping of logical threads to physical threads can be a direct one-to-one mapping or can be virtualized. Before VE-entry begins, the contents of each physical thread contain the state of whichever virtual thread was last run on it. Therefore, VE-entry millicode replaces the entire state with the state of the newly dispatched guest thread.

When core dispatch is invoked by a single-threaded hypervisor, it is the responsibility of millicode to load the individual guest thread (logical processor) state into the hardware and to set the hardware up to begin multithreaded execution. In order to improve efficiency by allowing each physical thread to load the majority of its own state in parallel, the millicode can load a small number of hardware registers for each of the secondary threads (either by the primary thread or another, already initiated, secondary thread). This can require that a secondary thread which is currently inactive from a hardware perspective be "woken up" to begin execution of a millicode routine which will complete the initialization of its own guest state and eventually begin execution of the guest program. There are cases that although no hypervisor or guest program code is running on a secondary thread, internal firmware may be running in order to handle, for example, some internal system management function. If this is the case, the machine must coordinate this with the dispatch of the guest threads.

There are some operations, such as purging of the TLB, which can be specified to apply to the entire core. This eliminates the need for each thread to determine if the purge is necessary and, when necessary, to perform that purge. In addition, there are some core resources which are shared or common between the physical threads within a core. Millicode can take advantage of the fact that shared resources need only be loaded from a single thread and that a single thread can load all copies of common thread resources if savings may be recognized to do so. VE-entry millicode can also use the guest-multithreading-enabled and thread-validity bits to bypass initialization of invalid logical threads in an effort to speedup the execution of initialization millicode on the valid threads. The flexible hardware design allows embodiments of the millicode to optimize their implementations as the design develops.

Figure 14A:
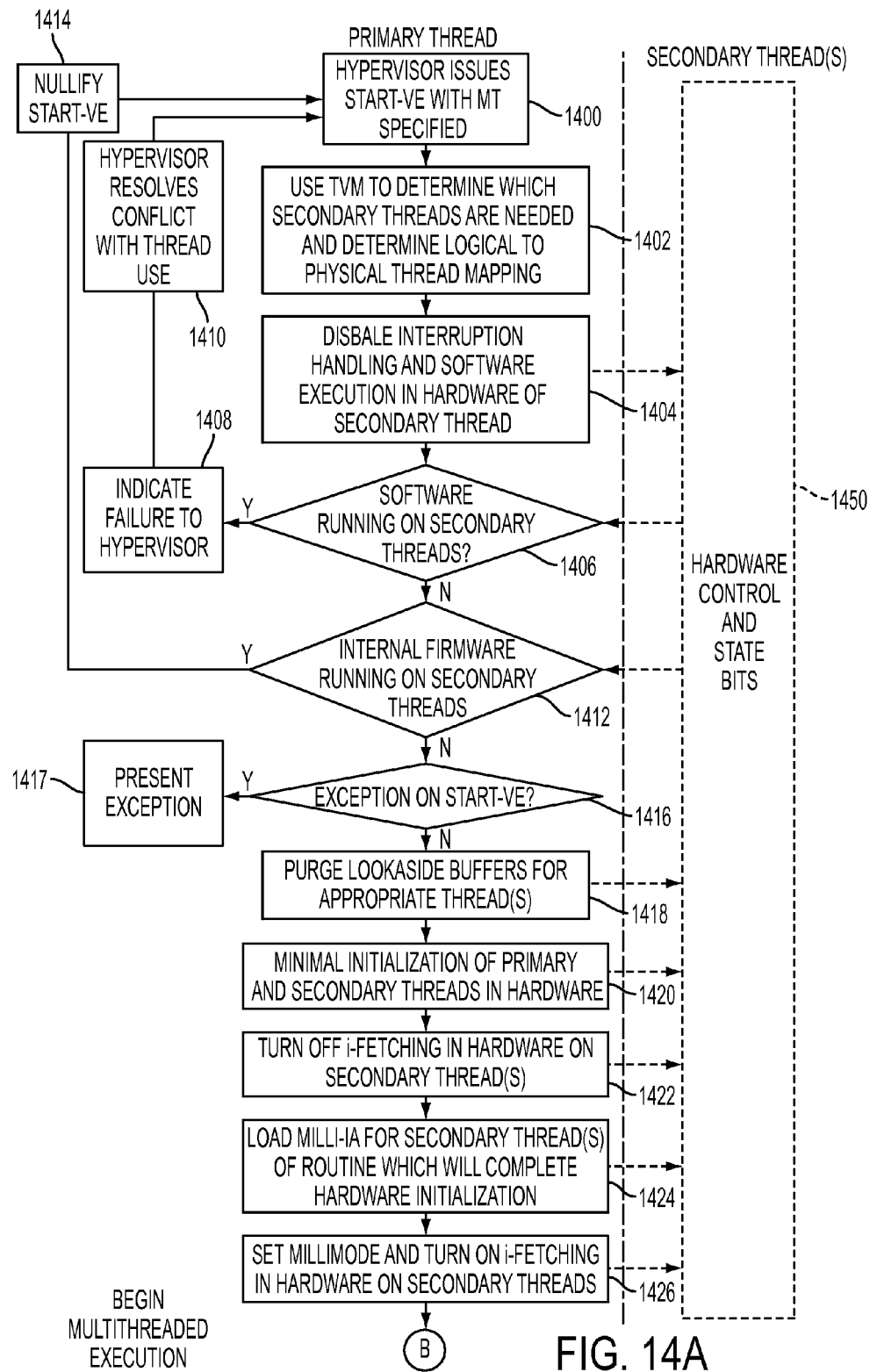
FIGS. 14A and 14B, depicts a machine implementation of core dispatch in accordance with an embodiment.
Figure 14B:
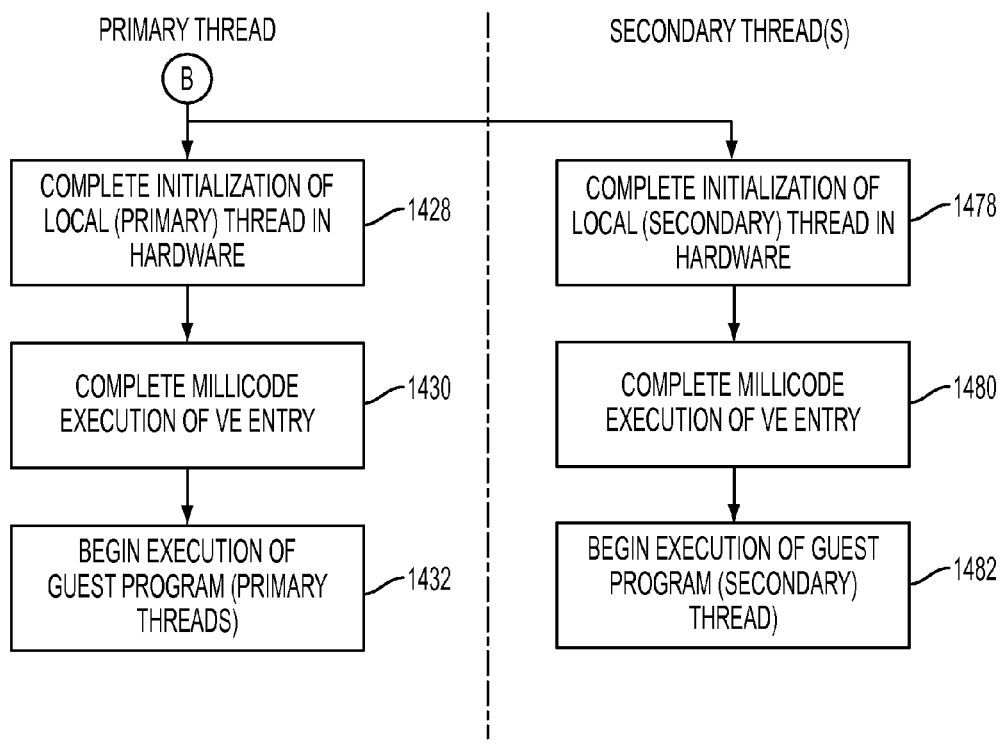

Turning now to FIG. 14, which includes FIGS. 14A and 14B, a machine implementation of core dispatch is generally shown in accordance with an embodiment. As shown in FIG. 14A, at block 1400, a core dispatch is initiated by the hypervisor running on a single thread (referred to as the primary thread) using a start-VE instruction where MT is specified. Based on the hypervisor issuing the start-VE instruction, VE-entry millicode is invoked on the primary thread, that is the thread that issued the instruction, and it starts by initiating multithreading on the hardware for the entire core. Much of this initialization can include testing hardware state bits from all applicable secondary threads and/or setting hardware control bits or fields in all applicable secondary threads. The control and state bits 1450 shown in FIG. 14A may logically reside in the hardware of the secondary thread itself or they may logically reside in common hardware resources shared between the threads but which represent and control the secondary thread. At block 1402, the VE-entry millicode determines, using the thread-validity mask (TVM) in the state description, which guest logical thread(s) are valid, from a software perspective, and therefore need to be loaded into the hardware. It also determines the mapping of the valid logical threads to physical threads.

Blocks 1404 through 1414 of FIG. 14A are performed by the millicode to verify that the physical threads requested are available. At block 1404 the millicode prevents the applicable secondary hardware threads from taking new interruptions which may invoke internal code or from beginning to run any new program code. This can be accomplished by setting appropriate hardware controls in the secondary thread(s). At block 1406, it is determined whether software is running on the secondary threads. In an embodiment, the hypervisor that is issuing the start-VE instruction on the primary thread guarantees that other hardware threads on this core are not running any program code (e.g. hypervisor or guest code). In another embodiment, the hypervisor issuing the start-VE instruction may not be able to easily determine if any other hardware threads required for this new start-VE are running program code, for example, code is associated with an independent start-VE. In this case, the VE-entry millicode checks the appropriate hardware state bit(s) on the secondary thread(s) at block 1406.

If it is determined, at block 1406, that program code is running on hardware needed to run a guest secondary thread, the new start-VE instruction is completed and at block 1408 the hypervisor is informed by the machine that the start-VE instruction was unsuccessful and, potentially, informed of the number of currently available hardware threads. In response, the hypervisor may take appropriate action such as reducing the number of valid guest threads to be dispatched or waiting for some predetermined time, as indicated by block 1410, before issuing the start-VE instruction again at block 1400. If it is determined, at block 1406, that the hardware is available, then processing continues to block 1412. At block 1412, the millicode determines, for example by checking the appropriate state bit(s) in the hardware, if any of the applicable secondary hardware thread(s) are running internal firmware code. If so, in one embodiment, the primary thread waits for the secondary thread(s) to finish running the internal code and, while waiting, in order to avoid hangs, the primary thread may honor certain interruptions. It may, however, block the secondary thread(s) from taking other interruptions so they can reach the idle state more quickly. Processing then continues at block 1416. In another embodiment, if a hardware thread is running internal firmware code, as determined at block 1412, the machine may nullify the start-VE instruction and return control back to the hypervisor at block 1414. This gives the primary thread the opportunity to take internal firmware interruptions and avoid potential hangs and, once no interruption is pending on the primary thread, the start-VE instruction is executed again. Both of these embodiments have benefits when compared to pausing the internal firmware and restarting it again on the hardware when multithreading work is completed since firmware code operation is often essential to system operation (concurrent upgrade, for example) and, in addition, threads run internal firmware infrequently enough that waiting for it to finish is a viable option.

Processing then continues at block 1416 to start the loading of the logical thread(s) into the physical threads on the physical core. At block 1416, the millicode checks for and takes exceptions related to certain exception conditions. Some of the exception conditions may apply to the start-VE instruction itself (e.g., invalid state description ring structure) and others are related to the conditions applicable to a secondary logical thread (e.g., an access exception on an NSD). At block

1418, entries from guest hardware lookaside buffers (including TLBs) can be purged. This may include purging lookaside buffers for the secondary thread(s), when applicable. At block 1420, the minimal states from the primary and secondary state descriptions are loaded and the required hardware facilities are initialized including each of the valid threads. In an embodiment, the minimal states include the state description addresses for the secondary threads. At block 1422, the hardware controls for the secondary thread(s) are set to stop fetching any internal instruction stream(s). This can simplify switching from a single-thread execution to multithread execution. At block 1424, the millicode instruction address (milli-IA) for each of the other valid secondary thread(s) is loaded. The milli-IA is the location where the secondary threads start executing once they begin fetching an internal instruction stream and it typically points to a location in millicode that will complete initialization of each valid logical thread. The primary thread continues its execution of VE-entry millicode and, therefore, no new milli-IA need be loaded there. At block 1426, in one embodiment, the primary thread wakes up the secondary thread(s) by setting hardware controls which change their execution mode to millimode which causes them to begin execution at the previously loaded milli-IA. In another embodiment, the primary thread (Ta) can wake up the first secondary thread (Tb); Tb can wake up the next secondary thread (Tc); and so on until all valid threads are active and running in the hardware. In an embodiment, secondary threads will not begin executing millicode instructions until another thread sets its execution mode to millicode execution mode, or millimode.

Referring now to FIG. 14B, at blocks 1428 and 1478, the primary thread and each valid secondary thread execute the millicode needed to complete loading of the associated guest logical thread state into hardware. In an embodiment, the state includes the guest general registers (GRs) 402, access registers (ARs) 404, control registers (CRs) 406, prefix register 408, guest timers 410, virtual CPU number (VCN) 412, program-status word (PSW) and instruction address (IA) 414, interception control (IC) bits 420, and logical-partition number (LPN) 432 as shown in FIG. 4. At blocks 1430 and 1480, the primary thread and secondary threads complete execution of VE-entry and they exit millicode mode (e.g., millimode). At blocks 1432 and 1482, they begin execution of the guest thread program instruction stream. In an embodiment, each thread's completion of VE-entry is independent from that of the other threads. In another embodiment, the threads sync-up before completing VE-entry.

In an embodiment, in order to support the use of core dispatch and the hypervisor running single threaded, a coordinated exit from virtual-execution (VE-exit) in which all the guest threads in a given core exit back to the ST host at the same time can be provided. In the context of coordinated VE-exit, types of VE-exit can be divided into three categories: (1) host interruptions which pertain to host operation; (2) host interruptions which pertain to guest operation; and (3) guest interceptions. Host external, I/O, and some machine check interruptions fall into VE-exit category (1). For this case, all guest threads are required to exit virtual-execution mode in order to allow the host to handle the interruption. This interruption will likely cause the host to dispatch a different guest. If the interruption occurs while running in virtual-execution mode, the host interruption can either be detected on all threads so that they can exit virtual-execution mode or be detected on a single thread which then signals the other threads if they should exit.

VE-exit category (2), host interruptions which pertain to the guest, can include some machine check interruptions (such as an uncorrectable storage error). In a non-multi-threaded situation, these conditions are presented as host interruptions. With core dispatch there is only one host thread but since these exceptions pertain to guest operation it is possible for multiple guest threads to detect distinct and different reasons for the same host interruption. To accommodate this, for core dispatch, when applicable, these host interruptions are instead presented in the corresponding guest state description as a new type of guest interception and are handled the same as category (3), described below. In an embodiment, host address-translation fault interruptions arising due to guest memory references also fall into category (2), and may be presented as another new type of guest interception.

Guest interceptions, even in a guest multithreaded environment, for both VE-exit categories (2) and (3) (above) pertain to a single guest thread and are independent from guest execution of another thread. It is further possible that multiple guest threads recognize such conditions concurrently, requiring the host to handle all of them. Typically, when presented with an interception including a code to represent the reason for the interception, the host will simulate some behavior on the guest's behalf and then re-dispatch that same guest. For these cases, since the host is running single-threaded, all guest threads must exit virtual-execution mode before the host can handle the interception(s). This can be accomplished by either waiting for all threads to exit naturally or by signaling the other threads to exit when one thread has determined that it must intercept back to the host. This is referred to as "coordinated VE-exit".

As each thread determines it must exit virtual-execution mode, it enters VE-exit, and waits in the initial VE-exit sync-up loop until all the other valid threads are also ready to exit. If the implementation requires, then it signals the other threads to exit before entering this sync-up loop. While in the VE-exit sync-up loop, only a minimum of interruptions are handled. In order to allow for the situation where a guest thread is required to exit virtual-execution mode when no host interruption and no guest interception apply for its thread, a "no-action" interception is defined to indicate to the host that no interception action is required on behalf of this guest.

Once all the threads have entered the initial VE-exit sync-up loop, the storing of guest data in all of the valid state descriptions can complete. That is, the current guest state which resides in the hardware is saved in the corresponding state description so this logical guest thread can be re-dispatched at a later time. A final VE-exit sync-up point is required after this storing is complete to guarantee all updates to the secondary thread state descriptions are complete before control is passed back to the hypervisor (which is typically running on the primary thread). Once VE-exit completes, the hypervisor can process each thread in the ring to determine if an interception was presented and, if so, handle it appropriately. After doing so it can then either re-dispatch this same guest logical core or a different one on the physical processor.

An embodiment includes a machine implementation of a coordinated exit from virtual-execution that includes the suspension of multithreaded guest execution and the return of control back to a single-threaded host. In a MT environment, the virtual-execution-exit (VE-exit) millicode is responsible, under most conditions, for signaling the other valid guest threads to exit virtual-execution as soon as it is feasible. It is possible for the delay seen by the thread requesting exit to be substantial, particularly if a thread is currently running internal code which cannot be interrupted to exit virtual-execution. While a thread is waiting for other threads to exit virtual-execution, millicode can be used to handle certain interruptions such as those which may result in hang conditions or those which may affect overall system performance. It may not be optimal for millicode to handle other interruptions if they may just delay the eventual exit from virtual-execution now that other threads (whose work may have been interrupted) have been signaled. This must all be done while still maintaining proper interruption priority.

In addition, much of the coordination required to exit virtual-execution which is done by millicode must take into account the state of each thread. For example, it must account for whether each logical thread is valid and if the physical thread is running internal code. Regardless of whether the primary thread is invalid, it must still be signaled since this is typically the thread on which the host program will be resumed. This is all accomplished using an internal millicode-requested interruption system.

The millicode may also perform some actions to free up physical registers that had been used by the secondary guest thread(s) but are no longer needed since the guest state has been saved and the host does not use the secondary thread(s). For example, millicode may zero out mapped registers as a means to free resources since hardware can, in certain implementations, map all of the logical registers with zero contents to a single physical register leaving the other physical registers for use by the primary thread. There may be other resources that are shared between the threads and can be freed up for use solely by the primary thread. Millicode can also mask off certain interruptions so that core resources are not used to invoke millicode unnecessarily.

Once any thread determines an exit from virtual-execution is required, it will signal the other threads as described below, for example, in reference to FIG. 15 which includes FIGS. 15A and 15B. The process used can vary based on whether the thread that is exiting virtual-execution is the primary thread or a secondary thread.

In an embodiment, a primary thread can signal valid secondary threads to exit virtual-execution if all of the following conditions are met: (1) it wants to exit virtual-execution mode and return control back to the hypervisor; (2) all other valid threads are not already in the process of exiting (i.e. at least one thread is still running guest instructions); (3) all the other threads have not already been signaled to exit; and (4) there is at least one other valid thread. If these conditions are not met, each secondary thread is given time to clean up and exit virtual-execution independently. In an embodiment, a secondary thread signals the primary thread (even if it is invalid) and all other valid secondary threads to exit virtual-execution mode if all of conditions (1)-(3) above are met. In an embodiment, a secondary thread must send a signal to the primary thread even if it is the only valid thread since it must signal the primary thread to complete the coordinated exit from virtual-execution.

Figure 15A:
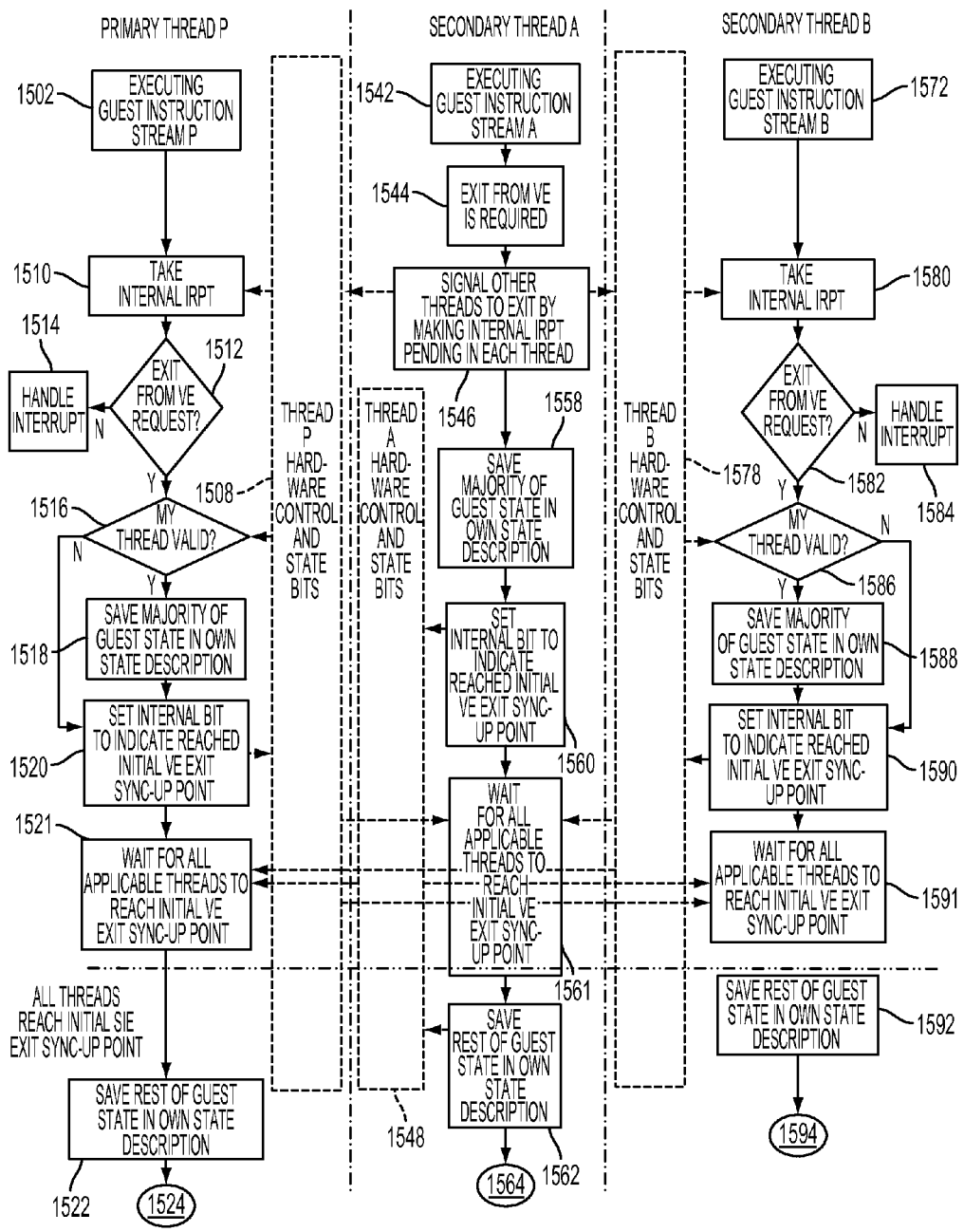
FIGS. 15A and 15B, depicts a machine implementation of a coordinated exit from virtual-execution in accordance with an embodiment.
Figure 15B:
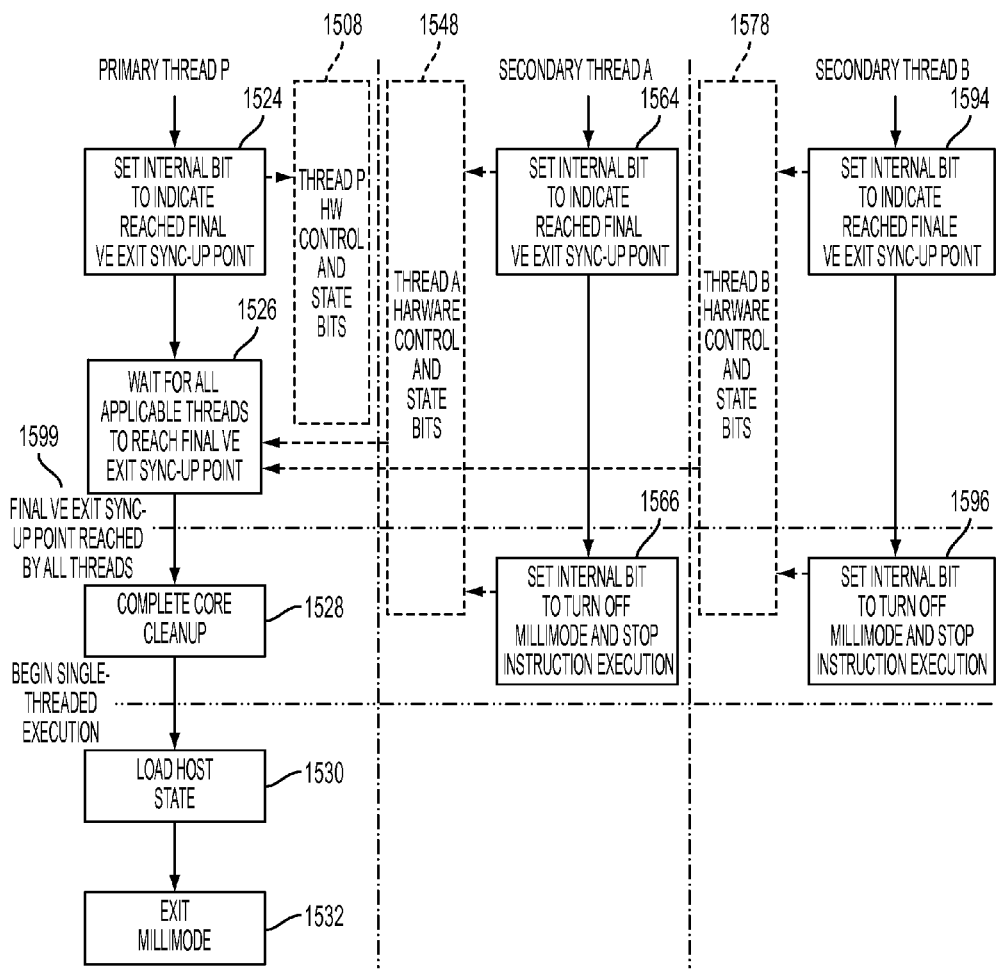

Turning now to FIG. 15, which includes FIGS. 15A and 15B, a machine implementation of a coordinated exit from virtual-execution is generally shown in accordance with an embodiment. In the example shown in FIG. 15, primary thread P is executing guest instruction stream P at 1502, secondary thread A is executing guest instruction stream A at 1542, and secondary thread B is executing guest instruction stream B at 1572. At block 1544, secondary thread A determines that it must exit virtual-execution and, using the criteria described above, determines at block 1546 that it must signal the other threads to also exit. Secondary thread A signals the other threads by making an internal exit-virtual-execution request interruption pending in the hardware state control of primary thread P 1508 and the hardware state control of secondary thread B 1578. Also shown in FIG. 15A is the hardware state control of secondary thread A 1548. When responding to the internal interruption at block 1510 for primary thread P and at block 1580 for secondary thread B, each thread checks the reason for the internal interruption and determines, at block 1512 for primary thread P and at block 1582 for secondary thread B, if the internal interruption is an exit-virtual-execution request. If it is determined not to be an exit-virtual-execution request, then primary thread P and secondary thread B perform blocks 1514 and 1584 respectively to handle the other interruption request.

If the interruption is an exit-virtual-execution request, then in an embodiment, each thread can independently perform the following process. At block 1516 for primary thread P and at block 1586 for secondary thread B, it is determined if the thread is valid. Secondary thread A which requested the exit from virtual-execution can be assumed to be valid. For a thread determined to be valid, the majority of the associated guest state from the hardware is saved into its own state description. This includes, as shown in FIG. 4, the guest general registers (GRs) 402, access registers (ARs) 404, control registers (CRs) 406, program-status word (PSW) and instruction address (IA) 414. Guest state which did not change during virtual-execution, such as the virtual CPU number (VCN) 412 and the logical-partition number (LPN) 432, do not need to be saved. This is shown in FIG. 15A at block 1518 for primary thread P, at block 1558 for secondary thread A, and at block 1588 for secondary thread B. Each thread updates its internal state to indicate that it is at the initial VE-exit sync-up point. This is shown in FIG. 15A at block 1520 for primary thread P, at block 1560 for secondary thread A, and at block 1590 for secondary thread B.

The threads each wait for the primary thread (e.g., primary thread P) and all valid secondary threads (e.g., secondary threads A and B) to reach the initial sync-up point before continuing. This is shown in FIG. 15A at block 1521 for primary thread P, at block 1561 for secondary thread A, and at block 1591 for secondary thread B. Once all of the threads reach the initial VE-sync-up point in the exit-virtual-execution millicode, each of the threads finish updating the appropriate information in the state description. Examples of this information can include the guest CPU timer which is part of the guest timers 408 in FIG. 4. This is shown in FIG. 15A at block 1522 for primary thread P, at block 1562 for secondary thread A, and at block 1592 for secondary thread B. Delaying this state saving until the sync-up point improves consistency in guest timing between the threads.

Referring now to FIG. 15B, each thread updates its own internal state to indicate that it is at the final sync-up point in the VE-exit millicode. This is shown in FIG. 15B at blocks 1524 for primary thread P, at blocks 1564 for secondary thread A, and at blocks 1594 for secondary thread B. In addition, primary thread A waits for all of the threads to reach the final sync-up point 1599 at block 1526 before continuing to block 1528. Each secondary thread sets an internal hardware bit to indicate that it is no longer executing a valid program instruction stream which causes the machine to exit millimode and stop executing code. This is shown in FIG. 15B at block 1566 for secondary thread A, and at block 1596 for secondary thread B. In an embodiment, each secondary thread will not execute any program code until the next Start-VE however it may execute internal code, as needed, to handle internal interruptions.

Once all threads have reached the final sync-up point in VE-exit millicode, shown as point 1599 in FIG. 15B, single-threaded execution is started on primary thread P. Primary thread P completes core cleanup at block 1528, loads the hypervisor state including the host program IA at block 1530 into the hardware, and exits millimode at block 1532. As a result, primary thread P is running in host mode and will handle any appropriate host interruptions, and the hypervisor will handle any guest interceptions.

Figure 16:
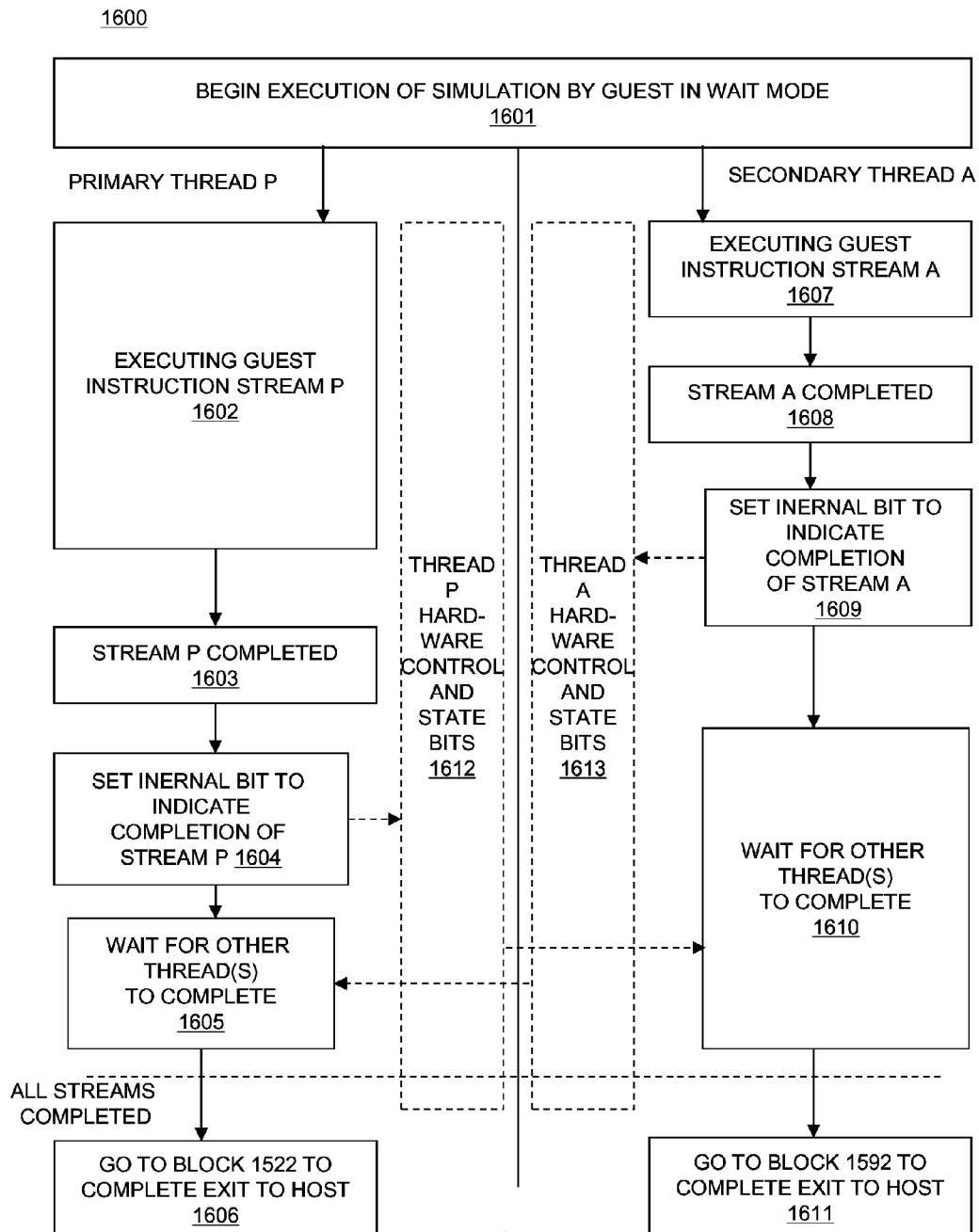
FIG. 16 depicts a machine implementation of a coordinated exit from virtual-execution for a simulation environment in wait mode in accordance with an embodiment.

FIG. 16 illustrates a machine implementation 1600 of a coordinated exit from virtual-execution for a MT simulation environment in wait mode in accordance with an embodiment. In the example shown in FIG. 16, first, in block 1601, the execution of the MT simulation is begun by a guest whose virtual-execution exit is via wait mode. The simulation may specify the mode in which to end the simulation. Multiple threads corresponding to the simulation, i.e. primary thread P and secondary thread A, are launched. In blocks 1602 and 1607, thread P executes its instruction stream P, while thread A executes its instruction stream A. Then, in block 1608, instruction stream A, belonging to thread A, is completed, and thread A determines that it must exit virtual-execution (as is performed in block 1544 of FIG. 15A). Next, because the simulation exiting condition is the wait mode, thread A does not signal the other threads to exit virtual-execution. Rather, thread A saves the majority of its guest state in its own state description (as is performed in block 1558 of FIG. 15A), sets a reason for its exit in block 1609 that indicates a completion of its instruction stream, and sets an internal bit in thread A hardware control and state bits 1613 indicating that thread A has reached the initial VE exit sync-up point (as performed in 1560 of FIG. 15A). Thread A then waits for any other valid thread(s) belonging to the simulation to exit virtual execution and reach the initial sync-up point in block 1610.

In block 1603, thread P completes execution of instruction stream P and determines that it must exit virtual-execution. Thread P saves the majority of its guest state in its own state description (as is performed in block 1558 of FIG. 15A), and then sets an internal bit in thread P hardware control and state bits 1612 indicating thread P has exited virtual execution and reached the initial VE exit sync-up point. Thread A, which is in the waiting state in block 1610, is notified that stream P has completed based on setting of the internal bit by thread P in thread P hardware control and state bits 1612 in block 1604. Thread P also goes into the waiting state in block 1606, and is also notified that thread A has completed based on the internal bit in thread A hardware control and state bits 1613 being set. At this point, all threads have exited virtual execution instruction streams of the simulation have been completed. Thread P proceeds to block 1522 of FIG. 15A in block 1606, and thread A proceeds to block 1592 of FIG. 15A in block 1611, in order to complete exiting to the host as described with respect to FIGS. 15A-B. At this point, all threads of the simulation have completed their respective instruction streams, and full results of the simulation are available after the exit to the host. FIG. 16 is shown for illustrative purposes only; a MT simulation that is executed with its exiting condition in wait mode according to FIG. 16 may include any appropriate number of threads; each thread in the MT simulation waits until all of the threads of the MT simulation have completed their respective instruction stream to proceed with exiting to the host. Further, a plurality of threads of an MT simulation in wait mode may complete their instruction streams in any appropriate order.

Figure 17:
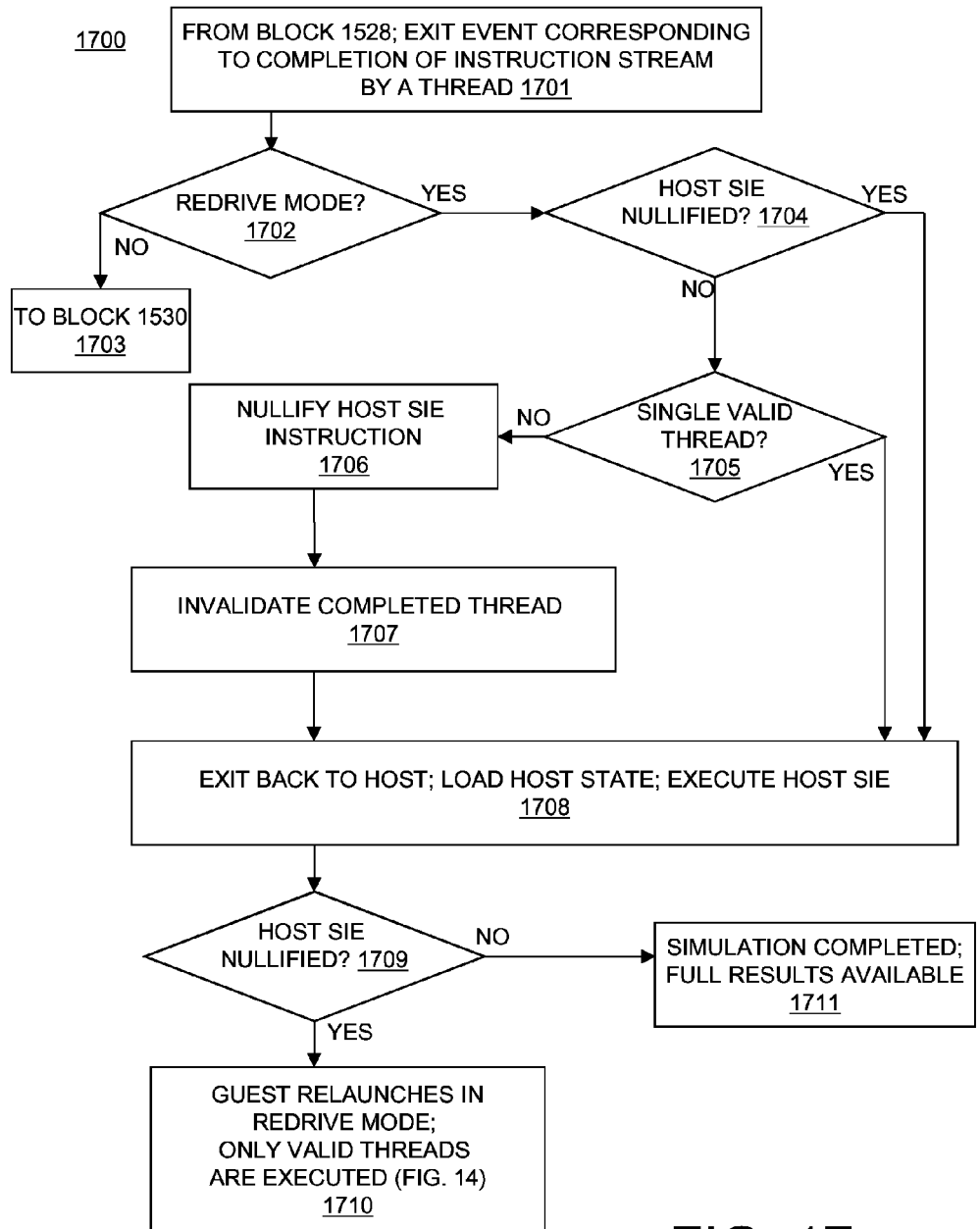
FIG. 17 depicts a process flow of a coordinated exit from virtual-execution for a simulation environment in redrive mode in accordance with an embodiment.

FIG. 17 illustrates an embodiment of a method 1700 for a coordinated exit from virtual-execution for a MT simulation environment in redrive mode in accordance with an embodiment. Prior to execution of method 1700, the threads of the simulation are each executing their respective instruction streams as described with respect to blocks 1502, 1542, and 1572 of FIG. 15A. Then, in block 1701, a thread of a plurality of threads of the simulation completes its instruction stream, generating an exit event requiring an exit of the guest to the host as shown, for example, with respect to blocks 1544/1546 of FIG. 15A. Blocks 1701-1706 of method 1700 may be executed by primary thread P after block 1528 of FIG. 15B; i.e., flow may proceed from block 1528 of FIG. 15B to block 1702. In block 1702, it is determined if the MT simulation is being run in redrive mode. This may have been specified by the simulation when execution of the simulation was begun. If it is determined in block 1702 that the simulation is not being run in redrive mode, flow proceeds to block 1530 of FIG. 15B, the host state is loaded, and method 1700 ends. If it is determined in block 1702 that the simulation is being executed in redrive mode, flow proceeds to block 1704, in which it is determined whether the host SIE is already nullified due to the interception reason of the thread that generated the exit event. If it is determined in block 1704 that the host SIE is already nullified, then flow proceeds to block 1708. However, if it is determined in block 1704 that the host SIE is not nullified, flow proceeds to block 1705. In block 1705, it is determined whether a single thread of the MT simulation is currently valid, i.e., whether only a single bit of the TVM, such as TVM 520 of FIG. 5, is set to valid. If only a single bit of the TVM is set to valid, it is determined that all threads of the simulation have completed their instruction streams and reached their respective interception reasons, and the flow proceeds from block 1705 to block 1708.

If multiple bits of the TVM are determined to be set to valid in block 1705, and one of the valid threads has a no-action interception reason indicating that at least one thread of the MT simulation has not completed its instruction stream, flow proceeds to block 1706. In block 1706, the host SIE instruction is nullified. Nullifying the host SIE instruction comprises setting the first instruction in the host state to point back to the host SIE instruction. Flow then proceeds from block 1706 to block 1707, in which the thread which completed its instruction stream and triggered the current exit event (i.e., in the example of FIGS. 15A-B, thread A in blocks 1544/1546) is invalidated. The thread that completed is invalidated by setting its respective bit in the TVM to invalid. Flow then proceeds from block 1707 to block 1708.

In block 1708, the system exits back to the host and loads the host state. Next, in block 1709, if the host SIE is nullified, flow proceeds from block 1709 to block 1710, in which the execution of the host SIE instruction causes the guest to relaunch the simulation in redrive mode. Only valid threads, as indicated by the TVM, are executed in the relaunched simulation. The host SIE instruction address is now pointing to the instruction beyond the SIE instruction in block 1710. The valid threads of the simuation then resume execution, as described with respect to FIGS. 14A-B, until a thread completes and triggers another exit, as described with respect to blocks 1544/1546 of FIG. 15A, at which point method 1700 is repeated starting at block 1701. The guest running the simulation may be repeatedly relaunched by method 1700, and execution of the remaining valid threads continued, until there is only a single valid thread of the simulation in block 1705. Then, in block 1709, the host SIE is not nullified, and flow proceeds from block 1709 to block 1711, at which point the simulation is completed, including all instruction streams of all threads. Full results of the simulation are available for analysis, and control remains with the host. FIG. 17 is shown for illustrative purposes only; a MT simulation that is executed in redrive mode according to FIG. 17 may include any appropriate number of threads; and method 1700 is repeated until all of the threads of the MT simulation have completed their respective instruction streams. Further, a plurality of threads of an MT simulation in redrive mode may complete their instruction streams in any appropriate order.

Table 1 illustrates an example of execution of method 1700 for a MT simulation comprising two threads, T0 and T1, which is executing instructions from two logical threads in two emulation modes, Guest1 (G1) and Guest2 (G2). The simulation starts with thread T0 executing host instructions and thread T1 being available but not running any instruction stream, and ends with T0 running back host instructions (0I19). Instruction 0I1 is the start-VE instruction that dispatches two logical threads specified by the start-VE instruction into the two physical threads. T0 has an instruction stream comprising instructions 0I1 to 0I19, and T1 has an instruction stream comprising instructions 1I1 to 1I4. There are two execution sequences shown in Table 1; in the first execution sequence, T1 completes its instruction stream and asks T0 to exit at instruction 0I8. Based on the request from T1, T0 exits to the host with the T1 next-sequential-address in the T1 State Description, the host SIE instruction is nullified according to method 1700, and the bit corresponding to T1 is set to invalid in the TVM. Then T0 is relaunched by the nullified host SIE instruction and finishes executing its instruction stream in the second execution sequence.

TABLE 1

| First execution sequence: | |
|---|---|
| T0 | T1 |
| 0I1 {Host->Guest1 with TVM='11'} | |
| 0I2 {G1,0I2} | 1I1 {G1,1I1} |
| 0I3 {G1,0I3} | 1I2 {G1,1I2} |
| 0I4 {G1,0I4} | 1I3 {G1,1I3} |
| 0I5 {G1->G2} | 1I4 {G1,1I4} |
| 0I6 {G2,0I6} | End of T1 Guest1 stream |
| 0I7 {G2,0I7} | |
| 0I8 {G2,0I8} <<<< T1 asks T0 to exit | |
| END of T0 Guest2 stream {G2->G1} | |
| END of T0 Guest1 stream {G1->Host with T1 TVM=0 and SIE Nullified} | |
| Second execution sequence after redrive: | |
| T0 | T1 |
| 0I1 {Host->Guest1 with TVM='10'} | |
| 0I5 {G1->G2} | |
| 0I9 {G2,0I9} | |
| 0I10 {G2,0I10} | |
| 0I11 {G2,0I11} | |
| 0I12 {G2,0I12} | |
| 0I13 {G2,0I13} | |
| 0I14 {G2,0I14} | |
| 0I15 {G2,0I15} | |
| 0I16 {G2,0I16} | |
| END of T0 Guest2 stream {G2->G1} | |
| 0I17 {G1,0I17} | |
| 0I18 {G1,0I18} | |
| End of T0 Guest1 stream {G1->Host with SIE not nullified} | |
| 0I19 {Host instructions} | |
| END of Host instructions | |
| END of testcase | |

Technical effects and benefits include the ability to perform a coordinated exit from a dispatched MT guest logical core that is running a simulation back to a ST host.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for exiting a multithreaded guest virtual machine (VM) that is running in a simulation environment, the computer system comprising:
   a configuration comprising a machine enabled to operate in a single thread (ST) mode and a multithreading (MT) mode, the machine including physical threads; and
   the machine configured to perform a method comprising:
   executing the simulation by a guest entity on the core in MT mode, the guest entity comprising all or a portion of a guest VM, and the guest entity comprising a plurality of logical threads executing on the physical threads, wherein each of the plurality of logical threads comprises a respective instruction stream;
   detecting, at the machine, an exit event corresponding to completion, by a first thread of the plurality of logical threads, of the instruction stream corresponding to the first thread; and
   based on the detecting, determining whether the simulation is executing in a redrive mode or a wait mode, and, based on determining that the simulation is executing in the redrive mode:
      determining whether a thread validity marker (TVM) of the guest entity indicates that multiple threads of the plurality of logical threads are valid;
      based on determining that the TVM of the guest entity indicates that multiple threads of the plurality of logical threads are valid, nullifying a start interpretive execution (SIE) instruction of a host;
      setting a bit corresponding to the first thread in the TVM to invalid;
      initiating execution of the host, wherein initiating execution of the host comprises executing the nullified SIE instruction; and,
      based on executing the nullified SIE instruction, relaunching the guest entity in the redrive mode.

2. The computer system of claim 1, wherein relaunching the guest entity in the redrive mode comprises executing only threads of the plurality of logical threads that are indicated to be valid by the TVM, and wherein the relaunching is performed based on at least one of the threads of the plurality of logical threads that are indicated to be valid by the TVM having had a no-action interception reason from the exit event.

3. The computer system of claim 2, further comprising detecting, at the machine, an exit event corresponding to completion, by a next thread of the plurality of logical threads, of the instruction stream corresponding to the next thread, and, based on the detecting, determining whether the TVM of the guest entity indicates that multiple threads of the plurality of logical threads are valid.

4. The computer system of claim 1, further comprising, based on determining that the TVM of the guest entity indicates that only a single thread of the plurality of logical threads is valid, determining that the simulation is completed, and initiating execution of the host without any nullified SIE instruction.

5. The computer system of claim 1, wherein nullifying the SIE instruction of the host comprises setting an instruction address of the host to point back to the host SIE instruction.

6. The computer system of claim 1, further comprising, based on determining that the simulation is executing in the wait mode:
   waiting, by the first thread, for a respective exit event indicating completion of the respective instruction stream of each of the plurality of logical threads of the guest entity; and
   based on detecting the respective exit event corresponding to each of the plurality of logical threads, determining that the simulation is completed and initiating execution of the host.

7. The computer system of claim 1, wherein whether the simulation is executing in the wait mode or redrive mode is indicated at a beginning the simulation.

8. A computer implemented method for exiting a multi-threaded guest virtual machine (VM) that is running in a simulation environment in a configuration comprising a machine enabled to operate in a single thread (ST) mode and a multithreading (MT) mode, the machine including physical threads, the method comprising:
   executing the simulation by a guest entity on the core in MT mode, the guest entity comprising all or a portion of a guest VM, and the guest entity comprising a plurality of logical threads executing on the physical threads, wherein each of the plurality of logical threads comprises a respective instruction stream;
   detecting, at the machine, an exit event corresponding to completion, by a first thread of the plurality of logical threads, of the instruction stream corresponding to the first thread; and
   based on the detecting, determining whether the simulation is executing in a redrive mode or a wait mode, and, based on determining that the simulation is executing in the redrive mode:
      determining whether a thread validity marker (TVM) of the guest entity indicates that multiple threads of the plurality of logical threads are valid;
      based on determining that the TVM of the guest entity indicates that multiple threads of the plurality of logical threads are valid, nullifying a start interpretive execution (SIE) instruction of a host;
      setting a bit corresponding to the first thread in the TVM to invalid;
      initiating execution of the host, wherein initiating execution of the host comprises executing the nullified SIE instruction; and,
      based on executing the nullified SIE instruction, relaunching the guest entity in the redrive mode.

9. The method of claim 8, wherein relaunching the guest entity in the redrive mode comprises executing only threads of the plurality of logical threads that are indicated to be valid by the TVM, and wherein the relaunching is performed based on at least one of the threads of the plurality of logical threads that are indicated to be valid by the TVM having had a no-action interception reason from the exit event.

10. The method of claim 9, further comprising detecting, at the machine, an exit event corresponding to completion, by a next thread of the plurality of logical threads, of the instruction stream corresponding to the next thread, and, based on the detecting, determining whether the TVM of the guest entity indicates that multiple threads of the plurality of logical threads are valid.

11. The method of claim 8, further comprising, based on determining that the TVM of the guest entity indicates that only a single thread of the plurality of logical threads is valid, determining that the simulation is completed, and initiating execution of the host without any nullified SIE instruction.

12. The method of claim 8, wherein nullifying the SIE instruction of the host comprises setting an instruction address of the host to point back to the host SIE instruction.

13. The method of claim 8, further comprising, based on determining that the simulation is executing in the wait mode:
   waiting, by the first thread, for a respective exit event indicating completion of the respective instruction stream of each of the plurality of logical threads of the guest entity; and
   based on detecting the respective exit event corresponding to each of the plurality of logical threads, determining that the simulation is completed and initiating execution of the host.

14. The method of claim 8, wherein whether the simulation is executing in the wait mode or redrive mode is indicated at a beginning the simulation.

15. A computer program product for exiting a multi-threaded guest virtual machine (VM) that is running in a simulation environment in a configuration comprising a machine enabled to operate in a single thread (ST) mode and a multithreading (MT) mode, the machine including physical threads, the computer program product comprising:
   a computer readable storage medium having program instructions embodied therewith, wherein the computer readable storage medium is not a signal, the program instructions readable by a processing circuit to cause the processing circuit to perform a method comprising:
      executing the simulation by a guest entity on the core in MT mode, the guest entity comprising all or a portion of a guest VM, and the guest entity comprising a plurality of logical threads executing on the physical threads, wherein each of the plurality of logical threads comprises a respective instruction stream;
      detecting, at the machine, an exit event corresponding to completion, by a first thread of the plurality of logical threads, of the instruction stream corresponding to the first thread; and
      based on the detecting, determining whether the simulation is executing in a redrive mode or a wait mode, and, based on determining that the simulation is executing in the redrive mode:
         determining whether a thread validity marker (TVM) of the guest entity indicates that multiple threads of the plurality of logical threads are valid;
         based on determining that the TVM of the guest entity indicates that multiple threads of the plurality of logical threads are valid, nullifying a start interpretive execution (SIE) instruction of a host;
         setting a bit corresponding to the first thread in the TVM to invalid;
         initiating execution of the host, wherein initiating execution of the host comprises executing the nullified SIE instruction; and,
         based on executing the nullified SIE instruction, relaunching the guest entity in the redrive mode.

16. The computer program product of claim 15, wherein relaunching the guest entity in the redrive mode comprises executing only threads of the plurality of logical threads that are indicated to be valid by the TVM, and wherein the relaunching is performed based on at least one of the threads of the plurality of logical threads that are indicated to be valid by the TVM having had a no-action interception reason from the exit event.

17. The computer program product of claim 16, further comprising detecting, at the machine, an exit event corresponding to completion, by a next thread of the plurality of logical threads, of the instruction stream corresponding to the next thread, and, based on the detecting, determining whether the TVM of the guest entity indicates that multiple threads of the plurality of logical threads are valid.

18. The computer program product of claim 15, further comprising, based on determining that the TVM of the guest entity indicates that only a single thread of the plurality of logical threads is valid, determining that the simulation is completed, and initiating execution of the host without any nullified SIE instruction.

19. The computer program product of claim 15, wherein nullifying the SIE instruction of the host comprises setting an instruction address of the host to point back to the host SIE instruction.

20. The computer program product of claim 15, further comprising, based on determining that the simulation is executing in the wait mode:
- waiting, by the first thread, for a respective exit event indicating completion of the respective instruction stream of each of the plurality of logical threads of the guest entity; and
- based on detecting the respective exit event corresponding to each of the plurality of logical threads, determining that the simulation is completed and initiating execution of the host.

* * * * *